(12) United States Patent
Linnell et al.

(10) Patent No.: US 9,744,665 B1
(45) Date of Patent: Aug. 29, 2017

(54) OPTIMIZATION OF OBSERVER ROBOT LOCATIONS

(71) Applicant: X Development LLC, Mountain View, CA (US)

(72) Inventors: Jeffrey Linnell, Woodside, CA (US); Anthony Sean Jules, Oakland, CA (US)

(73) Assignee: X Development LLC, Mountain View, CA (US)

( * ) Notice: Subject to any disclaimer, the term of this patent is extended or adjusted under 35 U.S.C. 154(b) by 9 days.

(21) Appl. No.: 15/007,558

(22) Filed: Jan. 27, 2016

(51) Int. Cl.
  *B25J 9/10* (2006.01)
  *B25J 9/16* (2006.01)

(52) U.S. Cl.
  CPC ............... *B25J 9/10* (2013.01); *B25J 9/1682* (2013.01); *Y10S 901/01* (2013.01); *Y10S 901/46* (2013.01)

(58) Field of Classification Search
  CPC ......... B25J 9/10; B25J 9/1682; Y10S 901/01; Y10S 901/46
  See application file for complete search history.

(56) References Cited

U.S. PATENT DOCUMENTS

| | | | |
|---|---|---|---|
| 2015/0197010 A1* | 7/2015 | Ruuspakka | B25J 9/1664 700/245 |
| 2016/0350589 A1* | 12/2016 | Chiu | G06K 9/00355 |

\* cited by examiner

*Primary Examiner* — Ian Jen
(74) *Attorney, Agent, or Firm* — McDonnell Boehnen Hulbert & Berghoff LLP

(57) ABSTRACT

Example implementations may relate to optimization of observer robot locations. In particular, a control system may detect an event that indicates desired relocation of observer robots within a worksite. Each such observer robot may have respective sensor(s) configured to provide information related to respective positions of a plurality of target objects within the worksite. Responsively, the control system may (i) determine observer robot locations within the worksite at which one or more of the respective sensors are each capable of providing information related to respective positions of one or more of the plurality of target objects and (ii) determine a respectively intended level of positional accuracy for at least two respective target objects. Based on the respectively intended levels of positional accuracy, the control system may select one or more of the observer robot locations and may direct one or more observer robots to relocate to the selected locations.

23 Claims, 14 Drawing Sheets

OPTIMIZATION OF OBSERVER ROBOT LOCATIONS

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working autonomously in various environments becomes apparent. Therefore, a demand for such robotic systems has helped open up a field of innovation in robot parts, sensing techniques, as well as component design and assembly.

SUMMARY

Example implementations may relate to a control system that is programmatically arranged to optimize locations of observer robots throughout a worksite. In particular, the observer robots may provide to the control system information related to positions of target objects throughout the worksite, such as of construction materials, tools, mover robots, and/or worker robots, among others. And in doing so, the position information may be provided at a certain respective level of positional accuracy for each such target object.

In some cases, however, the control system may detect an event indicating that the observer robots should be relocated, such as when an observer robot's sensor is occluded and is thus no longer capable of providing position information for a certain target object for instance. When the control system detects such an event, the control system may responsively determine observer robot locations at which sensors are not occluded and are thus able to provide position information, and the control system may also determine intended levels of positional accuracy for one or more of the target objects (e.g., highest priority target objects). Then, the control system may select one or more of the determined locations so that the control system can obtain information for each target object and can do so at the intended level of positional accuracy for each such target object. And once the locations have been selected, the control system may then direct observer robots to relocate to the selected locations.

In one aspect, a method is provided. The method involves detecting, by a control system, an event that indicates desired relocation of one or more of a plurality of observer robots within a worksite, where each respective observer robot of the plurality of observer robots has one or more respective sensors configured to provide information related to respective positions of a plurality of target objects within the worksite. The method also involves, in response to detecting the event, the control system: (i) determining one or more observer robot locations within the worksite at which one or more of the respective sensors are each capable of providing information related to respective positions of one or more of the plurality of target objects and (ii) determining a respectively intended level of positional accuracy for at least two respective target objects of the plurality of target objects. The method additionally involves, based at least in part on the determined respectively intended levels of positional accuracy, the control system selecting one or more of the determined observer robot locations within the worksite. The method further involves directing, by the control system, one or more of the plurality of observer robots to relocate to the one or more selected observer robot locations within the worksite.

In another aspect, a non-transitory computer readable medium is provided. The non-transitory computer readable medium having stored therein instructions executable by one or more processors to cause a control system to perform operations. The operations include detecting an event that indicates desired relocation of one or more of a plurality of observer robots within a worksite, where each respective observer robot of the plurality of observer robots has one or more respective sensors configured to provide information related to respective positions of a plurality of target objects within the worksite. The operations also include, in response to detecting the event, (i) determining one or more observer robot locations within the worksite at which one or more of the respective sensors are each capable of providing information related to respective positions of one or more of the plurality of target objects and (ii) determining a respectively intended level of positional accuracy for at least two respective target objects of the plurality of target objects. The operations additionally include, based at least in part on the determined respectively intended levels of positional accuracy, selecting one or more of the determined observer robot locations within the worksite. The operations further include directing one or more of the plurality of observer robots to relocate to the one or more selected observer robot locations within the worksite.

In yet another aspect, a control system is provided. The control system includes one or more processors, a non-transitory computer readable medium, and program instructions stored on the non-transitory computer readable medium and executable by the one or more processors to detect an event that indicates desired relocation of one or more of a plurality of observer robots within a worksite, where each respective observer robot of the plurality of observer robots has one or more respective sensors configured to provide information related to respective positions of a plurality of target objects within the worksite. The program instructions are also executable to, in response to detecting the event, (i) determine one or more observer robot locations within the worksite at which one or more of the respective sensors are each capable of providing information related to respective positions of one or more of the plurality of target objects and (ii) determine a respectively intended level of positional accuracy for at least two respective target objects of the plurality of target objects. The program instructions are also executable to, based at least in part on the determined respectively intended levels of positional accuracy, select one or more of the determined observer robot locations within the worksite. The program instructions are further executable to direct one or more of the plurality of observer robots to relocate to the one or more selected observer robot locations within the worksite.

In yet another aspect, a system is provided. The system may include means for detecting an event that indicates desired relocation of one or more of a plurality of observer robots within a worksite, where each respective observer robot of the plurality of observer robots has one or more respective sensors configured to provide information related to respective positions of a plurality of target objects within the worksite. The system may also include means for, in response to detecting the event, (i) determining one or more observer robot locations within the worksite at which one or more of the respective sensors are each capable of providing information related to respective positions of one or more of the plurality of target objects and (ii) determining a respectively intended level of positional accuracy for at least two respective target objects of the plurality of target objects. The system may additionally include means for, based at least in part on the determined respectively intended levels of positional accuracy, selecting one or more of the determined observer robot locations within the worksite. The system may further include means for directing one or more of the plurality of observer robots to relocate to the one or more selected observer robot locations within the worksite.

These as well as other aspects, advantages, and alternatives, will become apparent to those of ordinary skill in the art by reading the following detailed description, with reference where appropriate to the accompanying drawings.

DETAILED DESCRIPTION

Figure 1:
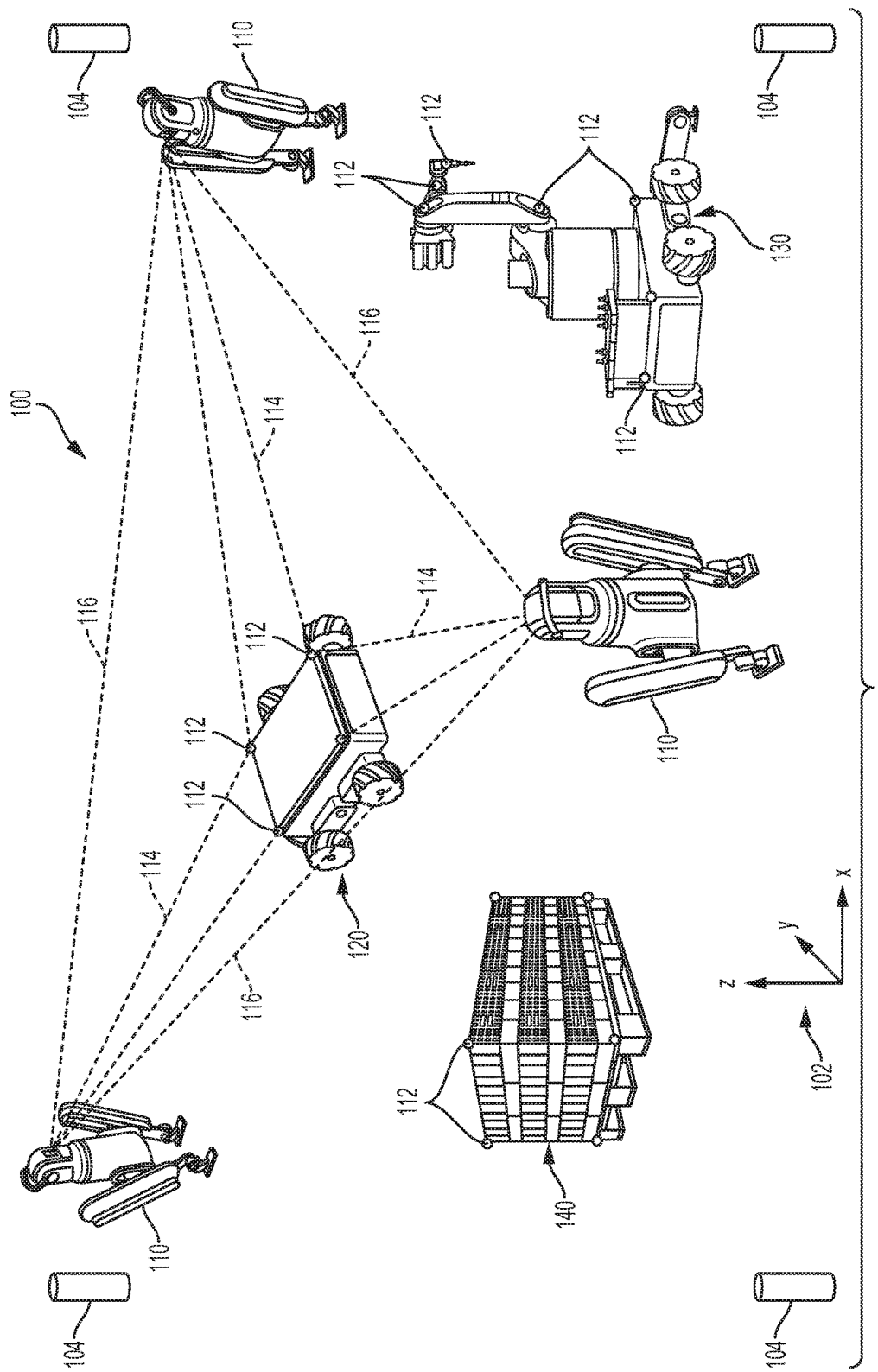
FIG. 1 depicts a worksite coordinate frame according to an example implementation.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

According to various implementations, a construction site may provide a space for construction of buildings, roads, and/or bridges, among others. To appropriately carry out this construction, information related to respective positions of various entities and/or objects within the construction site is generally needed. For example, construction specialists (e.g., humans, robots, and/or control systems) may seek to obtain or otherwise determine sets of three-dimensional (3D) coordinates in the construction site that define respective positions within the volume in the construction site that are occupied by construction materials, completed portions of a construction project, robots, robot components, and/or work surfaces, among other possibilities. Moreover, since a construction site is generally a dynamic environment, this information would ideally be updated periodically or continuously (e.g. in real-time), so that construction specialists may obtain or otherwise determine position, orientation, and/or pose of entities and/or objects within the volume of the construction site. As such, this information may be a foundation for all other aspects of work done within such a worksite.

Illustrative implementations relate to a control system that optimizes locations of observer robots throughout a worksite, such as a construction site for instance. In particular, the observer robots may operate in a worksite, and in doing so, the observer robots may each have sensors that provide position information for at least one target object within the worksite and perhaps also sensors that provide information related to work progress within the worksite. These target objects may include tools, construction material, and/or other robots, among others. As such, the control system may dynamically optimize the locations of the observer robots to ensure that position information is being provided on an as-needed basis for various target objects throughout the worksite.

More specifically, as an observer robot provides position information, the observer robot may provide a line of sight between the observer robot's sensor and a target object. For example, a laser tracker in an observer robot may direct a laser beam toward a retroreflective marker attached to a target object and may do so along a line of sight. Moreover, as an observer robot provides position information, the observer robot may provide the position information for a certain target object and may do so at a respective level of positional accuracy for that certain target object.

In some cases, however, the observer robot may no longer be able to provide the line of sight and/or may no longer be able to provide position information at the respective level of positional accuracy. This situation may occur due to one of various events. For instance, the line of sight may be occluded when another object ends up being positioned directly between the observer robot's sensor and the target object. And in another instance, a user may request the system to provide a different level of positional accuracy for the target object at issue, such as a higher level for example. So due to such situations, the control system may be programmatically arranged to detect one or more such events and to responsively carry out operations to optimize locations of the observer robots.

In accordance with the present disclosure, the control system may carry out the optimization by determining observer robot locations at which sensors are capable of providing position information, such as locations at which observer robots are able to provide the above-mentioned respective lines of sight. Also, the control system may determine respective levels of positional accuracy intended for each target object, some of which may have been adjusted based on a user's request and/or for other reasons, such as based on changes in conditions within the worksite, among others. Then, the control system may select at least some of the observer robot locations based on the intended levels and perhaps based on other factors as well.

In the process of selecting observer robot locations, the control system may specifically attempt to select locations so as to ensure that a line of sight is provided for each target object and thus that position information is obtained for each target object. However, if the control system is not able to ensure that position information is obtained for each target object, then the control system may select locations so as to at least obtain position information for the highest priority target objects. Moreover, the control system may select locations to ensure that position information is provided at the respectively intended levels of positional accuracy for every target object for which the control system ends up obtaining position information. As such, once the control system selects the locations, the control system may then direct observer robots to relocate to the selected locations.

II. EXAMPLE SYSTEMS

A. Example Worksite Coordinate Frame

FIG. 1 depicts a worksite coordinate frame 100, according to an example embodiment. The worksite coordinate frame 100 may define a portion of an environment in which objects, machines, and perhaps humans may be located. The worksite coordinate frame 100 may take on a three-dimensional form and may be used for various purposes. For instance, the worksite coordinate frame 100 may be defined for a construction site where the construction of a building or another project is being or is about to be carried out.

While various aspects of the disclosure are discussed below in the context of a construction site, example implementations are not limited to construction sites and may extend to a variety of other worksite coordinate frames, such as retail spaces, manufacturing facilities, distribution facilities, office spaces, shopping centers, festival grounds, and/or airports, among other examples. Additionally, while one worksite coordinate frame 100 is shown in FIG. 1, example implementations may be carried out in the context of a number of worksite coordinate frames.

As depicted in FIG. 1, the worksite coordinate frame 100 includes a number of observer robots 110, a mover robot 120, a worker robot 130, and construction materials 140.

The construction materials 140 may be any materials or tools located in a construction site. For example, in FIG. 1, the construction materials 140 are depicted as a palette of bricks. Other examples of construction materials 140 may include, but are not limited to: drywall, screws, nails, mortar, cement, water, soil, gravel, glass, metal framing, metal sheets, bonding materials, landscaping materials, etc.

The worker robot 130 may be a robotic device configured to perform a task within the worksite coordinate frame 100. In the illustrated scenario, the worker robot 130 includes an end effector tool mounted to a robotic arm. The end effector tool may be configured to perform a task on a work surface, such as drilling, milling, welding, nailing, riveting, sanding, spraying, gripping, or any other task typically performed during construction of a building. Further, the robotic arm of the worker robot 130 may include a mount to which different types of end effectors can be attached. As such, different end effectors may be swapped out such that the worker robot 130 can perform different types of tasks. Further, the worker robot 130 may be capable of moving throughout the worksite. For example, as depicted in FIG. 1, the worker robot 130 may include wheels. However, other configurations for providing mobility are possible as well (e.g., biped devices, quadruped devices, treads, tracks, etc.).

The mover robot 120 may be a robotic device configured to move items throughout the worksite coordinate frame 100. For example, the mover robot 120 may be configured to move the construction materials 140 from one location within the worksite coordinate frame 100 to another. Further, the mover robot 120 may be capable of moving throughout the worksite. For example, as depicted in FIG. 1, the mover robot 120 may include wheels. However, other configurations for providing mobility are possible as well (e.g., biped devices, quadruped devices, treads, tracks, etc.).

The observer robots 110 may be configured to move about the worksite coordinate frame 100. For example, as depicted in FIG. 1, the observer robots 110 may be biped robotic devices capable of walking throughout the worksite coordinate frame 100. Alternatively, the observer robots 110 may include wheels, tracks, treads, or any other component that provides mobility.

The observer robots 110 may include sensors that facilitate tracking the location of target objects within the worksite coordinate frame 100. For example, the observer robots 110 may include laser tracker systems to track the location of the mover robot 120, worker robot 130, and construction materials 140 within the worksite coordinate frame 100. Laser trackers may be used to measure the location of objects by directing a laser beam at a retroreflective marker attached to the measured object. Light reflects off the retroreflective marker and returns to the laser tracker. The laser tracker may determine the location of the marker based on characteristics of the reflected light. Laser trackers may measure location with very high accuracy, but the measurement data may be provided at a low refresh rate. For example, a laser tracker may measure the location of an object several meters away with a resolution of a few hundredths of a millimeter, but the measurement may be provided at a refresh rate of the order of a few hertz.

In FIG. 1, the worksite coordinate frame 100 includes a number of pylon markers 104. The pylon markers 104 may be located at the boundaries of the worksite coordinate frame 100 and/or throughout the worksite coordinate frame 100 and may be used to establish a three-dimensional coordinate system 102 within the worksite coordinate frame 100. For example, the three-dimensional coordinate system 102 may be a Cartesian coordinate system with an x-axis, a y-axis, and a z-axis. One of the pylon markers 104 may be designated as the origin of the coordinate system 102, and the remaining pylon markers 104 may be spaced a known distance from the origin. As a result, each of the pylon markers 104 may be associated with a known (x, y, z) coordinate within the coordinate system 102, where the x-, y-, and z-coordinates correspond to a distance from the origin pylon marker along the x-, y-, and z-axes respectively.

The pylon markers 104 do not necessarily need to be located at the boundaries of the worksite coordinate frame 100, but may alternatively or additionally be arranged at various known locations throughout the worksite coordinate frame 100. For example, in some embodiments, the pylon markers 104 may be arranged in a two-dimensional or three-dimensional grid throughout the worksite. However, other configurations are possible as well, and the pylon markers 104 may be arranged in any manner of known locations in the worksite coordinate frame 100.

The pylon markers 104 may be retroreflective such that the laser tracker of an observer robot 110 may measure the location of the pylon markers 104 with respect to the observer robot 110. By determining the location of a pylon marker with known coordinates from an observer robot 110, the coordinates of the observer robot 110 may be derived. As an observer robot 110 moves about the worksite coordinate frame 100, it may occasionally provide a line of sight between its laser tracker and a pylon marker 104. This provides updated coordinates for the location of the observer robot 110 as it moves about the worksite coordinate frame 100.

In addition to the pylon markers 104, the worksite coordinate frame 100 may include a number of additional markers 112. The markers 112 may be attached to various target objects throughout the worksite coordinate frame 100. For example, as depicted in FIG. 1, respective markers 112 may be attached to the observer robots 110, the mover robot 120, the worker robot 130, and/or the construction materials 140. The location of the markers 112 may be measured to provide coordinates within the coordinate system 102 associated with the mover robot 120, worker robot 130, and/or construction materials 140. For example, as depicted in FIG. 1, a laser tracker in an observer robot 110 may direct a laser toward a retroreflective marker 112 attached to the mover robot 120 along a line of sight 114. By analyzing the reflected light, the laser tracker may determine the position of the retroreflective marker 112 with respect to the observer robot 110. Since the coordinates of the observer robot 110 within the coordinate system 102 are known, the position of the retroreflective marker 112 with respect to the observer robot 110 may be used to determine coordinates of the retroreflective marker 112 within the coordinate system 102. By determining coordinates of the markers 112, the locations of the mover robot 120, worker robot 130, and construction materials 140 within the worksite coordinate frame 100 may be tracked.

Similarly, an observer robot 110 may provide a line of sight 116 between itself and another observer robot. In this manner, the observer robots 110 may facilitate determining the location of other observer robots 110, and the location of the observer robots 110 within the worksite coordinate frame 100 may be tracked.

In some embodiments, determining the location of a target object in the worksite coordinate frame 100 may involve more than simply determining the location of a single point within a three-dimensional coordinate system. For instance, in some embodiments, the locations of a set of points may be determined to define a volume of the target object. For example, referring to FIG. 1, a three-dimensional space representing the volume of the construction materials 140 may be determined. The observer robots 110 may determine the locations of a set of markers 112 attached to the construction materials 140. The markers 112 may be attached to the boundaries or edges of the construction materials 140, or in some embodiments, the markers 112 may be arranged on the construction materials 140 in any known manner. By determining the location of the set of markers 112 arranged on the construction materials 140, the location of a three-dimensional volume may be determined indicating a shape of the construction materials 140 within the worksite coordinate frame 100. Similarly, by determining the locations of sets of markers 112 arranged on various target objects, three-dimensional volumes and their positions within the worksite coordinate frame 100 may be determined for the mover robot 120, the worker robot 130, the observer robots 110, or any other object in the worksite coordinate frame 100.

In some embodiments, determining the location of a target object in the worksite coordinate frame 100 may include determining a pose of the target object relative to the worksite coordinate frame 100. The pose of the target object may include a combination of the position and orientation of the object. Various processes may be used to determine the pose of a target object, including analytic or geometric methods, genetic algorithm methods, and/or learning-based methods, among others.

In some embodiments, where the target object is a robotic device, the pose of the robot may be determined based on its operational state. The robotic device may have various operational states that result in different poses. A control system may determine the operational state of the robotic device. Given that the volume and/or shape of the robotic device is already known or has otherwise been determined, the control system may determine the pose of the robotic device based on the determined operational state.

For example, referring to FIG. 1, the worker robot 130 includes a robotic arm that may be positioned in any number of poses based on its operational state. One operational state may include configuring the robotic arm to perform a task on a work surface. However, an operational state may include any configuration of a robotic device in the worksite coordinate frame 100 that results in an associated pose. The volume and shape of the various components of the robotic arm are known or have otherwise been determined. Thus, by determining the pose (e.g., the position and orientation) of the robotic arm based on the operational state of the worker robot 130, a three-dimensional volume representing the space occupied by the robotic arm within the worksite coordinate frame 100 may be determined.

B. Example Robotic Control Systems and Methods

Figure 2:
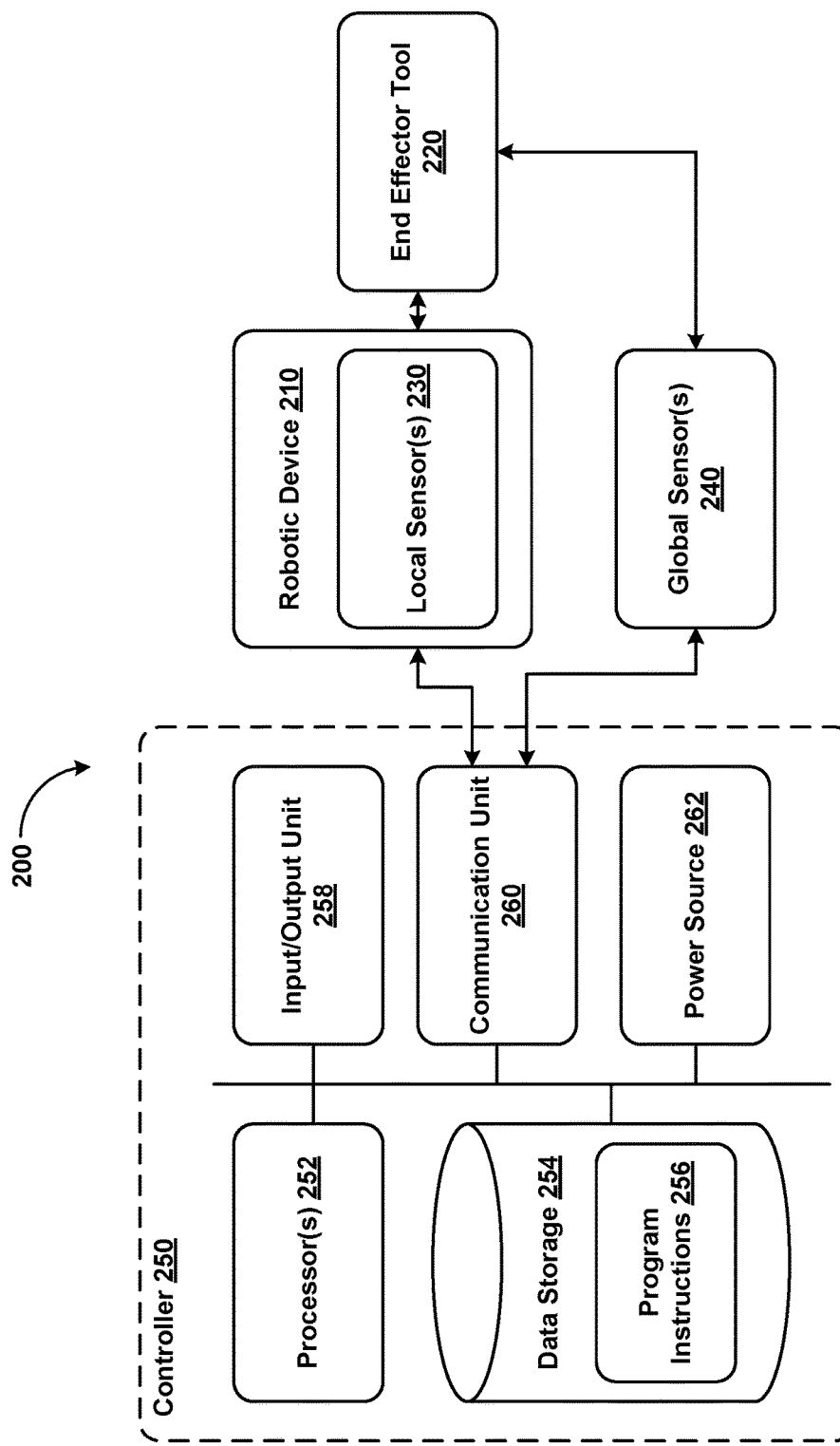
FIG. 2 is a simplified block diagram depicting components of a robotic device control system, according to an example implementation.

FIG. 2 is a simplified block diagram depicting components of a robotic device control system 200, according to an example embodiment. The robotic device control system 200 includes a robotic device 210 configured to manipulate an end effector tool 220. The end effector tool 220 may be configured to perform a task on a work surface and may be mounted to a moveable component, such as a robotic arm, of the robotic device 210. The robotic device 210 may be located within a worksite coordinate frame, such as the worksite coordinate frame 100 depicted in FIG. 1, and the robotic device 210 may, for example, be a worker robot, such as the worker robot 130 depicted in FIG. 1.

The robotic device control system 200 may further include local sensor(s) 230 and global sensor(s) 240 configured to determine the location of various objects in the coordinate frame of a worksite, such as the end effector tool 220, for example. The local sensor(s) 230 may be arranged on or within the robotic device 210 and may be configured to measure the location of the end effector tool 220 with respect to the work surface. The global sensor(s) 240, on the other hand, may be arranged within the worksite coordinate frame separate from the robotic device 210 and may be configured to measure the location of the end effector tool 220 with respect to the worksite coordinate frame.

The local sensor(s) 230 may provide location measurements of the end effector tool 220 at a higher refresh rate than the global sensor(s) 240, but may not be as accurate due to lower sensor resolution and/or error buildup. For example, the global sensor(s) 240 may include a laser tracker system with very high resolution (e.g., hundredths of a millimeter) and a low refresh rate (e.g., a few hertz), such as the laser tracker system included in the observer robots 110 in FIG. 1. And the local sensor(s) 230 may include a high speed camera for providing optical flow data or an inertial measurement unit (IMU) with a high refresh rate (e.g., 250 Hz for the camera and 1 kHz for the IMU) but lower accuracy due to drift and accumulation of error over time.

The global sensor(s) 240 are not limited to laser tracker systems, but may include any sensor capable of measuring the location of the end effector tool 220 with respect to the worksite coordinate frame, such as motion capture sensors, light detection and ranging (LIDAR) sensors, point cloud sensors, ultrasonic range sensors, Global Positioning System (GPS) receivers, sonar, optical sensors, Radio Frequency identification (RFID) systems, Near Field Communication (NFC) chips, wireless sensors, radio sensors, radars, cameras (e.g., color cameras, grayscale cameras, and/or infrared cameras), and/or range sensors (e.g., ultrasonic and/or infrared), among others.

Similarly, the local sensor(s) 230 are not limited to high speed cameras or IMUs, but may include any sensor capable of measuring the location of the end effector tool 220 with respect to the work surface, such as force sensors, proximity sensors, motion sensors (e.g., gyroscopes, and/or accelerometers), load sensors, position sensors, thermal imaging sensors, depth sensors (e.g., RGB-D, laser, structured-light, and/or a time-of-flight camera), ultrasonic range sensors, infrared sensors, optical sensors, Radio Frequency identification (RFID) systems, Near Field Communication (NFC) chips, wireless sensors, light sensors, touch sensors (e.g., capacitive sensors), cameras (e.g., color cameras, grayscale cameras, and/or infrared cameras), and/or range sensors (e.g., ultrasonic and/or infrared), among others.

Additionally, the local sensor(s) 230 and global sensor(s) 240 may be positioned within or in the vicinity of the worksite coordinate frame, among other possible locations. For example, the local sensor(s) 230 may be attached to the robotic device 210, and the global sensor(s) 240 may be attached to a different robotic device capable of moving throughout the worksite coordinate frame, such as the observer robots 110 depicted in FIG. 1. In some embodiments, the global sensor(s) 240 may be arranged in fixed locations throughout the worksite coordinate frame, for example, as a dedicated sensing installation. Further, an example implementation may also use sensors incorporated within existing devices, such as mobile phones, laptops, and/or tablets. These devices may be in possession of people located in the worksite coordinate frame, such as construction workers in a construction site.

FIG. 2 also depicts a controller 250 that may receive data from the local sensor(s) 230 and global sensor(s) 240. In particular, the local sensor(s) 230 and global sensor(s) 240 may provide sensor data to the controller 250 through a communication unit 260. The communication unit 260 may include wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/ or wireless protocols may be used, such as "3G" or "4G" data connectivity using a cellular communication protocol (e.g., CDMA, GSM, or WiMAX, as well as for "WiFi" connectivity using 802.11).

In other examples, the robotic control system 200 may include access points through which the local sensor(s) 230 and global sensor(s) 240 and/or controller 250 may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

The controller 250 is shown to include one or more processor(s) 252, data storage 254, program instructions 256, an input/output unit 258, and a power source 262. Note that the controller 250 is shown for illustration purposes only, as the controller 250 may include additional components and/or have one or more components removed without departing from the scope of the disclosure. Further, note that the various components of the controller 250 may be arranged and connected in any manner. The controller 250 may be incorporated in whole or in part into the robotic device 210 or may take the form of a desktop computer, a laptop, a tablet, a wearable computing device, and/or a mobile phone, among other possibilities.

Each processor, from the one or more processor(s) 252, may be a general-purpose processor or a special purpose processor (e.g., digital signal processors, application specific integrated circuits, etc.). The processor(s) 252 can be configured to execute computer-readable program instructions 256 that are stored in the data storage 254 and are executable to provide the functionality of the controller 250 described herein. For instance, the program instructions 256 may be executable to provide for processing of sensor data received from the local sensor(s) 230 and global sensor(s) 240.

The data storage 254 may include or take the form of one or more computer-readable storage media that can be read or accessed by the processor(s) 252. The one or more computer-readable storage media can include volatile and/or non-volatile storage components, such as optical, magnetic, organic or other memory or disc storage, which can be integrated in whole or in part with the processor(s) 252. In some embodiments, the data storage 254 can be implemented using a single physical device (e.g., one optical, magnetic, organic or other memory or disc storage unit), while in other embodiments, the data storage 254 can be implemented using two or more physical devices. Further, in addition to the computer-readable program instructions 256, the data storage 254 may include additional data such as diagnostic data, among other possibilities. Further, the controller 250 may also include a power source 262 configured to supply power to various components of the controller 250. Any type of power source may be used, such as direct current from a battery or alternating current from mains electricity.

FIG. 2 further depicts the controller 250 including an input/output unit 258. The input/output unit 258 may output information to a user through a display. The display may take on any form and may be arranged to project images and/or graphics to a user of the controller 250. In an example arrangement, a projector within the input/output unit 258 may be configured to project various projections of images and/or graphics onto a surface of the display. The display may include: an opaque or a transparent (or semi-transparent) matrix display, such as an electroluminescent display or a liquid crystal display, one or more waveguides for delivering an image to the user's eyes, or other optical elements capable of delivering an image to the user. A corresponding display driver may be disposed within the controller 250 for driving such a matrix display. Other arrangements may also be possible for the display. As such, the display may show a graphical user interface (GUI) that may provide an application through which the user may interact with the systems disclosed herein.

Additionally, the input/output unit 258 may receive user-input (e.g., from the user of the controller 250). In particular, the input/output unit 258 may allow for interaction with the GUI such as for scrolling, providing text, and/or selecting various features of the application, among other possible interactions. The input/output unit 258 may take on various forms. In one example, the input/output unit 258 may include a pointing device such as a computing mouse used for control of the GUI. However, if the input/output unit 258 includes a touch screen display, touch-input can be received (e.g., such as using a finger or a stylus) that allows for control of the GUI. In another example, the input/output unit 258 may include a keyboard that provides for selection of numbers, characters and/or symbols to be displayed via the GUI. For instance, in the arrangement where the input/output unit 258 includes a touch screen display, portions the display may show the keyboard. Thus, touch-input on the portion of the display including the keyboard may result in user-input such as selection of specific numbers, characters, and/or symbols to be shown on the GUI through the display. In yet another example, the input/output unit 258 may include a voice input device that receives audio input, such as from a user through a microphone, that is then interpretable using one of various speech recognition techniques into one or more characters that may be shown through the display. Other examples may also be possible.

C. Example Robotic Device

Figure 3:
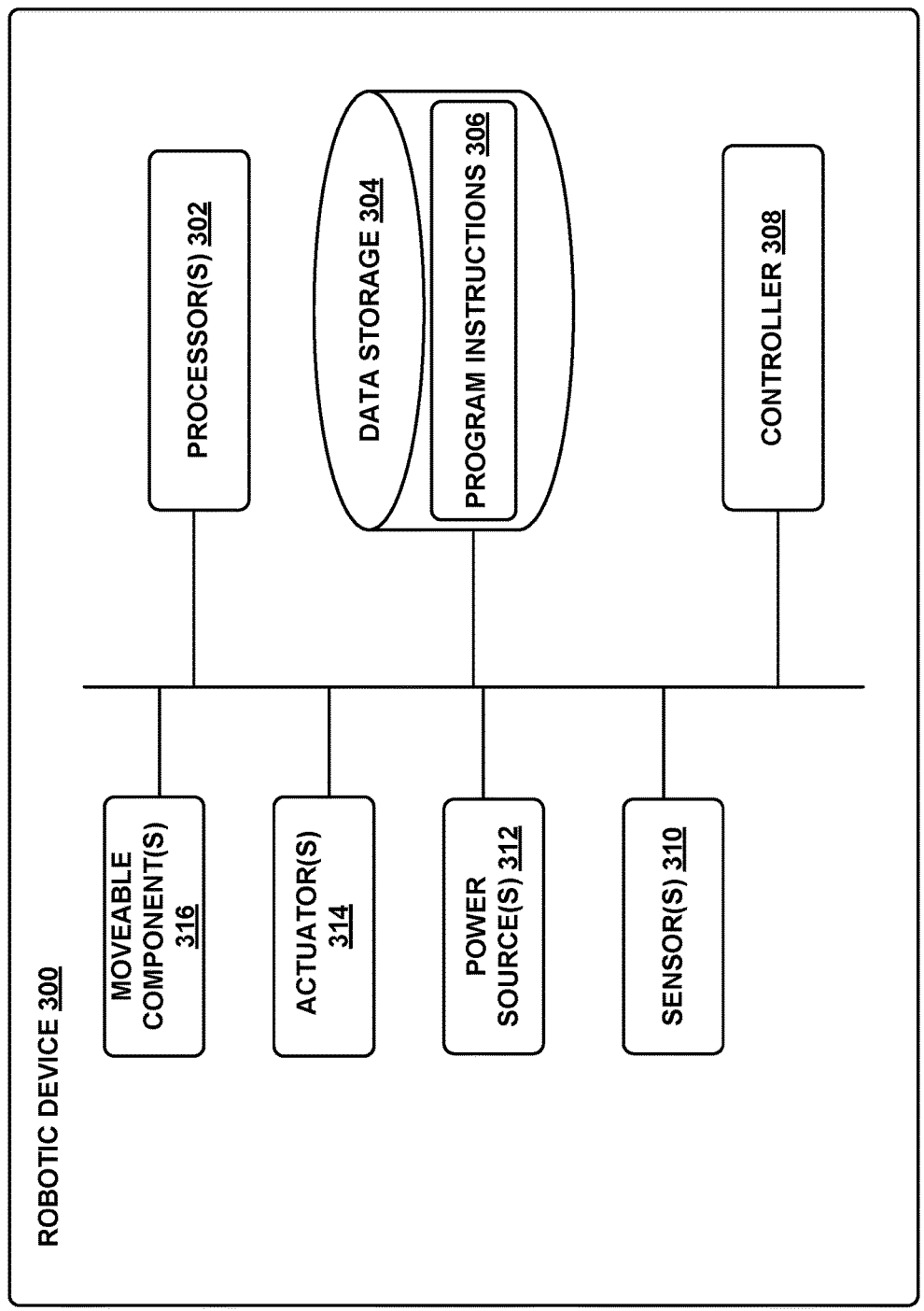
FIG. 3 is a simplified block diagram depicting components of a robotic device, according to an example implementation.

FIG. 3 shows an example configuration of a robotic device 300, which could take the form an observer robot 110, a mover robot 120, or a worker robot 130, among other possibilities. Generally, a robotic device 300 may be any device that has a computing ability and interacts with its surroundings with an actuation capability and/or with ability to emit/generate physical phenomena such as light and/or sound, among others. For instance, the robotic device 300 may be a humanoid robot, a robotic arm, or a quadruped robot, among others. A robotic device may also be any device that is generally understood to those of ordinary skill in the art as being a "robotic." The robotic device 300 may also be referred to as a robotic device, a robotic manipulator, a robot client, or a robot, among others.

The robotic device 300 is shown to include processor(s) 302, data storage 304, program instructions 306, controller 308, sensor(s) 310, power source(s) 312, actuator(s) 314, and movable component(s) 316. Note that the robotic device 300 is shown for illustration purposes only and robotic device 300 may include additional components and/or have one or more components removed without departing from the scope of the disclosure. Further, note that the various components of robotic device 300 may be arranged and connected in any manner.

Moreover, the above description of processor(s) 252, data storage 254, program instructions 256, sensors (e.g., local sensor(s) 230 and global sensor(s) 240), and/or power source 262, may apply to any discussion below relating to the respective component being used in another system or arrangements. For instance, as noted, FIG. 3 (among other possible figures) illustrates processors, data storage, program instructions, sensors, and/or power as being incorporated in another arrangement. These components at issue may thus take on the same or similar characteristics (and/or form) as the respective components discussed above in association with FIG. 2. However, the components at issue could also take on other characteristics (and/or form) without departing from the scope of the disclosure.

As noted, the robotic device 300 may include a controller 308 (e.g., taking the form of a microcontroller). The controller 308 may include processing unit and data storage, and may be arranged to manage or carry out various operations (e.g., individually or in collaboration with processor(s) 302). Thus, this controller 308 could take on the same or similar characteristics (and/or form) as the above-mentioned controller 250, but could take on other characteristics (and/or form) as well. So in some implementations, the controller 250 may be incorporated as part the robotic device 300 and thus controller 250 may itself be controller 308. In other implementation, controller 308 may be included as part of the robotic device 300 and controller 250 may be separate from the robotic device 400. Regardless of the implementations, these controllers may take various forms. For instance, a controller may take the form of a chip set, a server system, a digital signal processor, a programmable logic controller, and/or a sampled-data system, among other possibilities. Moreover, a controller could also be referred to herein as a control system, among other.

Additionally, the robotic device 300 may also include one or more actuator(s) 314. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, hydraulics, or electricity, among other possibilities. With this arrangement, actuator(s) 314 may cause movement of various movable component(s) 316 of the robotic device 300. The moveable component(s) 316 may include appendages/members such as robotic arms, legs, and/or hands, among others. The moveable component(s) 316 may also include a movable base, wheels, and/or end effectors, among others. Further, when a robotic device 300 includes at least one end effector, such an end effector may be a tool (e.g., a screwdriver, drill, welding iron, or some combination thereof) and/or a gripper, among others as discussed above.

III. EXAMPLE OPTIMIZATION OF OBSERVER ROBOT LOCATIONS

Figure 4:
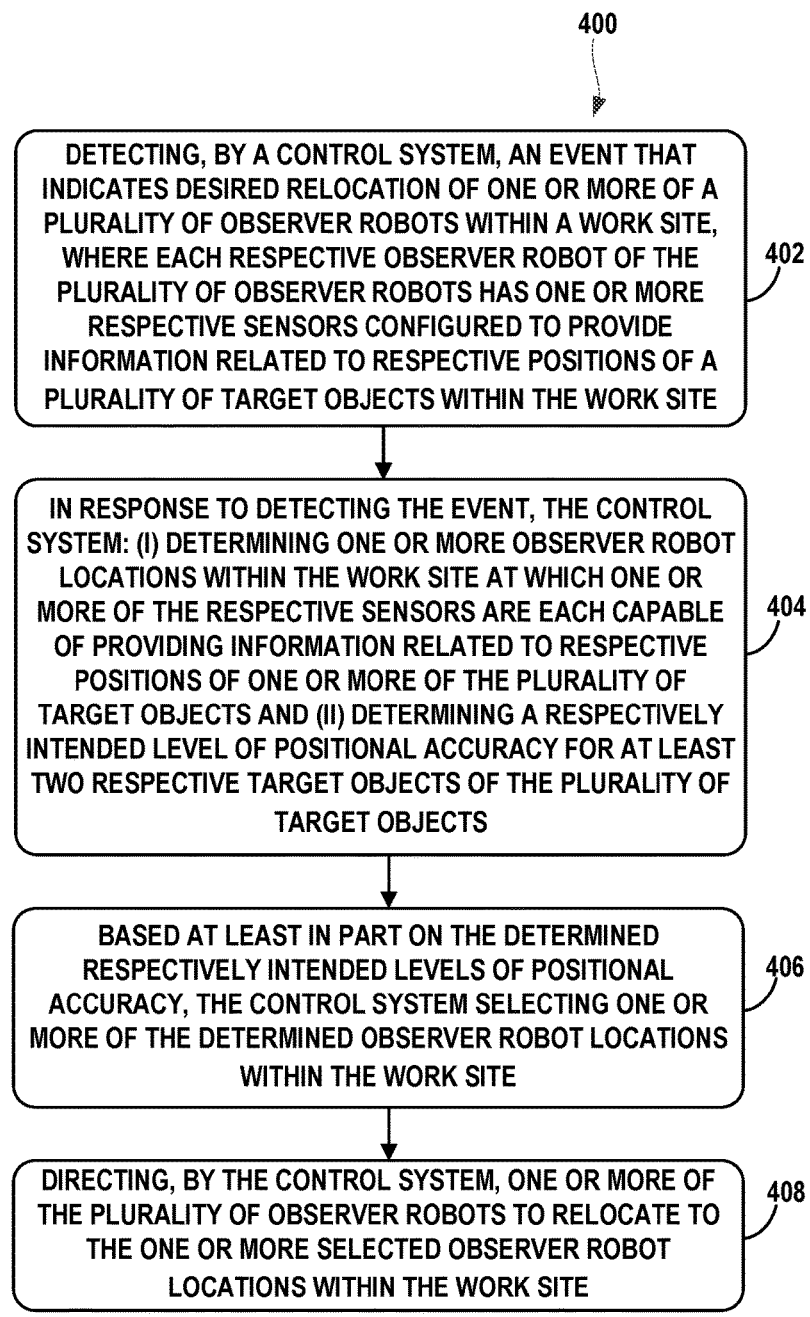
FIG. 4 depicts a flowchart of a method for optimizing observer robot locations, according to an example implementation.

FIG. 4 is a flowchart illustrating a method 400, according to an example implementation. In particular, method 400 may be implemented to optimize locations of observer robots.

Method 400 shown in FIG. 4 (and other processes and methods disclosed herein) presents a method that can be implemented within an arrangement involving, for example, the worksite coordinate frame 100, the robotic device control system 200, and/or the robotic device 300 (or more particularly by one or more components or subsystems thereof, such as by a processor and a non-transitory computer-readable medium having instructions that are executable to cause the device to perform functions described herein). Additionally or alternatively, method 400 may be implemented within any other arrangements and systems.

A. Detecting an Event

At block 402, method 400 involves detecting, by a control system (e.g., controller 250), an event that indicates desired relocation of one or more of a plurality of observer robots (e.g., observer robot(s) 110) within a worksite (e.g., worksite coordinate frame 100), where each respective observer robot of the plurality of observer robots has one or more respective sensors (e.g., global sensor(s) 240) configured to provide information related to respective positions of a plurality of target objects within the worksite. In accordance with the disclosure, a target object may include (without limitation): another observer robot 110, a mover robot 120, a worker robot 130, construction materials 140, and/or an end effector tool, among other possibilities.

In an example implementation, the control system may be arranged to detect at least one of various events each indicating that one or more observer robots should be relocated within the worksite. Detecting such an event could take the form of detecting sensor data (e.g., from global sensors 240) that is indicative of the desired relocation and/or detecting other signals (e.g., user-input data) that are indicative of the desired relocation, among others. In practice, various types and forms of sensor data (and/or other signals) could be used to represent each given event. So to detect an event, the control system may receive sensor data from various sensors within the worksite and/or other signals from various other entities within the worksite, and the control system may evaluate this received information to determine whether this received information is indicative of a desired relocation.

To do so, the control system may take one of various approaches. For instance, the control system may have stored thereon or may otherwise have access to mapping data that maps certain sensor data (and/or other signals) to an indication of whether or not a relocation of observer robots is desired. By way of example, the indication could take the form of a binary value, with a value of 1 (one) being indicative of desired relocation of one or more observer robot and with a value of 0 (zero) indicating that relocation of observer robots is not desired or otherwise necessary. So when the control system receives sensor data (and/or other signals), the control system may responsively refer to the mapping data to determine whether the received sensor data is indicative of desired relocation of observer robots. Other approaches are possible as well.

With these arrangements, the control system could detect various types of events. In one case, detecting an event may involve the control system determining that at least one sensor of at least one observer robot is no longer capable of providing information related to a respective position of at least one target object. For instance, the control system may determine that a line of sight (could also be referred to as a field of view) between a sensor of an observer robot and a target object is obstructed. By way of example, a mover robot 120 may move throughout the worksite and may end up being positioned between a laser tracker of an observer robot 110 and a marker 112 of a worker robot 130, thereby obstructing the line of sight between the laser tracker and the marker 112. Moreover, the control system may determine in various ways that the line of sight is obstructed. For example, the control system may determine a change (e.g., a threshold change) in position information provided by a first observer robot for a given target object while also determining no change in position information provided by a second observer robot for a given target object. Responsively, the control system may determine that a line of sight between the first observer robot and the given target object is obstructed. Other examples are also possible.

In another instance, the control system may determine that a power level in a power source of an observer robot is below a threshold power level, thereby indicating that the observer robot may not have sufficient power to provide to sensor(s) that obtain position information related to a target object (and perhaps may not have sufficient power to carry out other tasks as well). So when the control system determines a power level in a power source of an observer robot is below a threshold power level, then the control system may determine that the observer robot is no longer capable of providing information related to a respective position of the target object. And in yet another instance, the control system may determine that the control system stopped receiving position information from an observer robot, thereby potentially indicating that a sensor of the observer robot has either powered off or is defective. So when the control system determines that the control system stopped receiving position information from an observer robot, then the control system may responsively determine that the observer robot is no longer capable of providing information related to a respective position of the target object. Various other instances are possible as well.

In another case, an observer robot may provide a respective level of positional accuracy for a given target object. In particular, a respective level of positional accuracy may be based on metrics including accuracy, which may define a degree of closeness of a measured position value to a true position value, and/or precision, which may define a degree of closeness of measured position values to one another. Moreover, various currently known (or future developed) statistical metrics could be used to represent or otherwise determine the respective level of positional accuracy. For example, the control system may determine accuracy by determining a percent error, a percent accuracy, and/or a confidence interval, among others. And the control system may determine precision by determining a deviation, a standard deviation, and/or a confidence interval, among others. Other examples are also possible.

In this case, the respective level of positional accuracy for a given target object may be adjusted. More specifically, before the event at issue is detected, an observer robot may provide a first level of positional accuracy for a given target object. So detecting the event may involve or may otherwise be responsive to an adjustment from providing the first level of positional accuracy for the given target object to providing a second level of positional accuracy for the given target object. Accordingly, this adjustment may occur for various reasons.

In one instance, the control system may receive user-input data indicating the adjustment, such as when a user of the system essentially requests a respectively intended level of positional accuracy (e.g., a higher or a lower respective level of positional accuracy) for each of one or more target objects within the worksite. By way of example, this user-input data may be provided via the input/output unit 258 described above, among other options. Moreover, the user-input data may indicate the adjustment in various ways, such as by specifically indicating the second level of positional accuracy and/or by indicating an extent of increase or decrease of the level, among other options. Furthermore, the user-input data may specifically indicate at least one target object for which an adjustment is requested. By way of example, the system may have stored thereon or may otherwise have access to respective identifiers of various target objects and an observer robot may recognize a target object based on a respective identifier in various ways, such as by detecting on the target object a barcode having the identifier encoded thereon for example. So in this manner, a user may specify a target object for which an adjustment is requested and the observer robot could recognize the specified target object within the worksite. Other examples are possible as well.

In another instance, the control system may determine changes in one or more conditions within the worksite and, based on these changes, the control system may determine at least one corresponding desired adjustment of a respective level of positional accuracy, which may ultimately serve as an indication to the control system of a desired relocation of one or more observer robots so as perhaps achieve the desired adjustment(s). To determine the desired adjustment, the control system may have stored thereon or may otherwise have access to mapping data that maps certain changes to certain specific adjustments, and the control system may thus refer to such mapping data in response to determining at least one change in conditions, so as to ultimately determine the appropriate adjustment(s) to respective level(s) of positional accuracy. Other approaches are possible as well.

More specifically, the changes in conditions may cause one or more observer robots to start providing position information for at least one given target object at a different (e.g., higher or lower) respective level of positional accuracy, thereby indicating that the respective level of positional accuracy of the given target object should be adjusted, such as adjusted back to the respective level of positional accuracy provided before the changes in conditions occurred or perhaps to another level. Alternatively, the changes in conditions may or may not necessarily cause one or more observer robots to start providing position information for at least one given target object at a different respective level of positional accuracy. However, the changes in conditions may indicate that that the respective level of positional accuracy of the given target object should be adjusted, so as to essentially adapt to the changes in conditions for instance. In either case, these changes in conditions could take various forms.

In one example, the control system may determine a change in location within the worksite of one or more sensors, such as local sensor(s) 230 and/or global sensor(s) 240, among others. For instance, further user-input data may be provided via the input/out unit 258 indicating that a certain sensor has been added to a certain location within the worksite, that a certain sensor has been removed from a certain location within the worksite, and/or that a certain sensor has been relocated from a certain location within the worksite to another location within the worksite. Additionally or alternatively, the control system may determine a change in configuration of one or more sensors. For instance, the control system may determine a change from a laser tracker of an observer robot 100 is providing measurements at a first refresh rate to the laser tracker providing measurements at a second refresh rate.

In another example, the control system may determine a change in location within the worksite of one or more observer robots. For instance, further user-input data may be provided via the input/out unit 258 indicating that a certain observer robot has been manually added to a certain location within the worksite, that a certain observer robot has been manually removed from a certain location within the worksite, and/or that a certain observer robot has been manually relocated from a certain location within the worksite to another location within the worksite. Additionally or alternatively, the control system may determine a change in configuration of one or more observer robots. For instance, the control system may determine that a local software update has taken place within a certain observer robot and/or that a certain part of a certain observer robot has been replaced.

Moreover, the control system could make similar determinations regarding a change in location and/or a change in configuration of one or more other entities. For instance, the other entities may be other robots, such as robots other than observer robots 110 (e.g., a mover robot 120 and/or a worker robot 130). And in another instance, the other entities could be objects, such as a target object for which position information is provided and/or another object for which position information is not necessarily provided. Other instances are possible as well.

In yet another example, the control system may determine a change in work progress within the worksite. In particular, the control system may maintain or may otherwise have access to information representative of physical and functional characteristics of a worksite, such as to a building information model (BIM) for instance. Based on this information, the control system may determine progress of work within the worksite. For instance, the control system may determine progress on a certain task, such as determining progress of drilling on a work surface by a working robot 130 and/or progress of moving construction materials 140 by a mover robot 120. In another instance, the control system may determine when work has entered a new work phase, such as when a construction project has shifted from a certain phase (e.g., formation of building foundation) to another phase (e.g., erecting of steel column beams). In yet another instance, the control system may determine progress related to certain project goals, such as by determining progress towards achieving a certain engineering or architectural design goal specified in a BIM (e.g., progress toward achieving a building's target level of energy efficiency). Various other instances and examples are possible as well.

In yet another case, the control system may have stored thereon or may otherwise have access to information related to respective priority levels for each target object, with each such priority level indicating priority of providing position information for a respective target object. For instance, the control system may determine these priority levels by referring to mapping data that maps certain target objects to certain priority levels. So in this case, detecting the event may involve or may otherwise be responsive to an adjustment from providing the first priority level for a given target object to providing a second priority level for the given target object. Accordingly, this adjustment may occur for various reasons.

For instance, the control system may receive user-input data indicating this adjustment, And in another instance, the control system may determine changes in one or more conditions within the worksite and, based on these changes, the control system may determine at least one corresponding adjustment of a respective priority level, which may ultimately serve as an indication to the control system of a desired relocation of one or more observer robots so as perhaps provide position information in accordance with the adjusted priority level(s). Other cases and instances are possible as well.

Figure 5A:
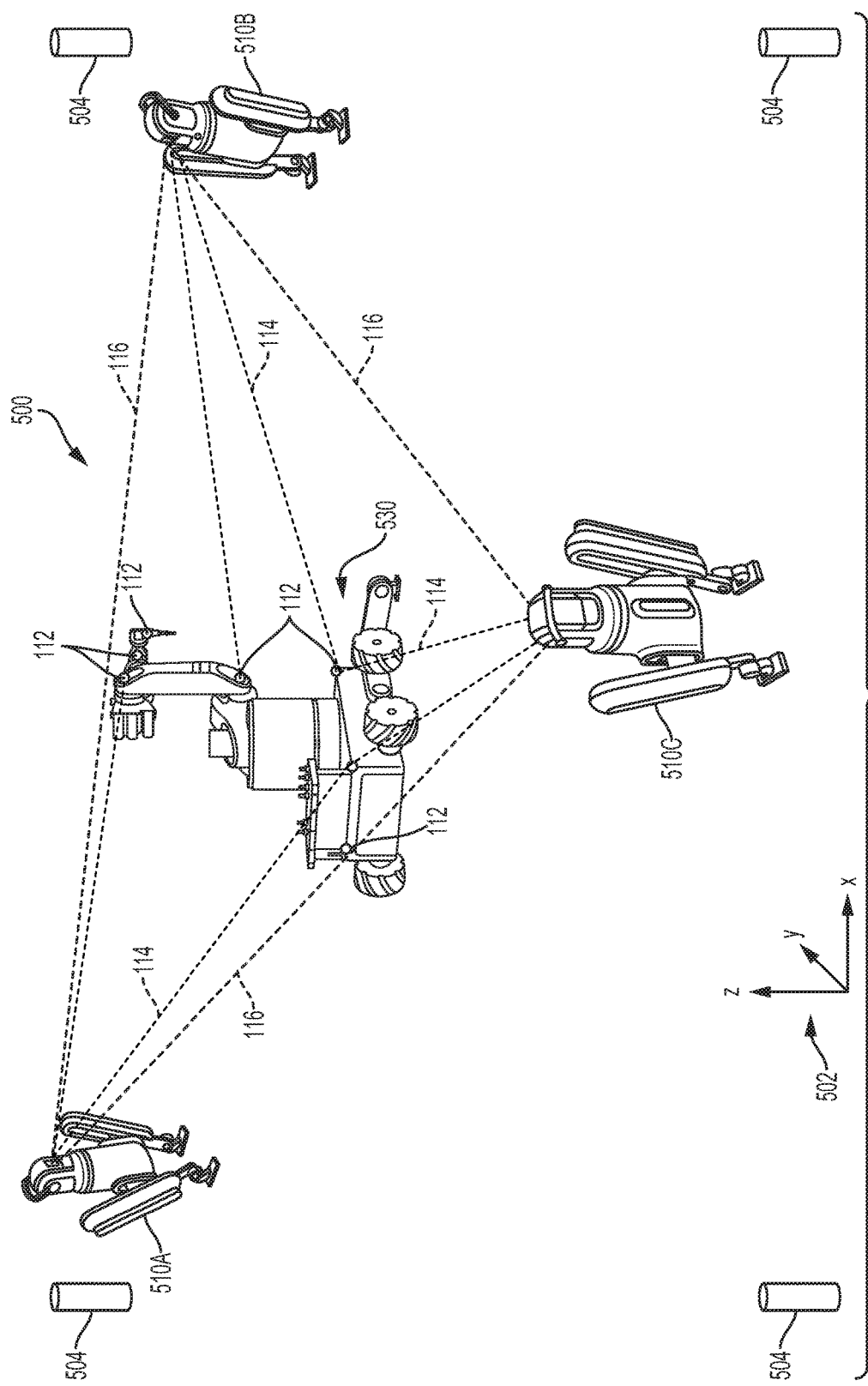
FIGS. 5A to 5B depict detection of an event, according to an example implementation.

FIG. 5A illustrates a worksite coordinate frame 500 including a plurality of pylon markers 504 that are located at the boundaries of the worksite coordinate frame 500 and/or throughout the worksite coordinate frame 500 and that may be used to establish a three-dimensional coordinate system 502 within the worksite coordinate frame 500. As shown in FIG. 5A, a laser tracker in each of observer robots 510A to 510C may direct a laser beam toward a retroreflective marker 112 attached to a worker robot 530 along a respective line of sight 114, so as to determine coordinates of the retroreflective marker 112 within the coordinate system 502. And by determining coordinates of the markers 112, the locations of the worker robot 530 may be tracked. Also, the observer robots 510A to 510C are shown to provide respective lines of sight 116 between one another, so that the observer robots 510A to 510C may track each other's respective locations within the worksite coordinate frame 500.

Figure 5B:
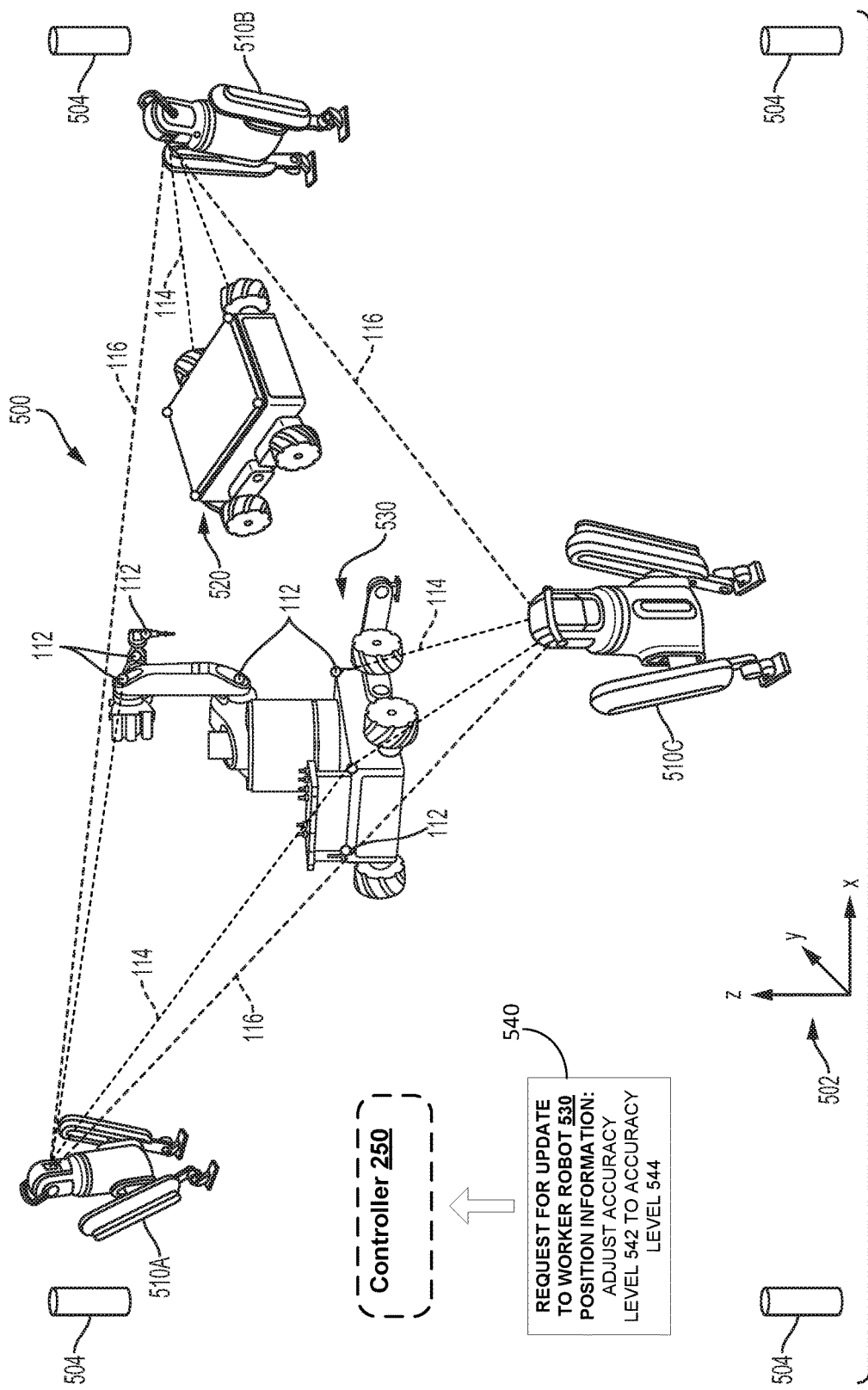

FIG. 5B then illustrates detection of events each indicative of a desired relocation of one or more of the observer robots 510A to 510C. As shown in FIG. 5B, a mover robot 520 moves throughout the worksite coordinate frame 500 and ends up being positioned between a laser tracker of the observer robot 510B and markers 112 of the worker robot 530, thereby obstructing the line of sight between this laser tracker and markers 112 of the worker robot 530. So when the mover robot 520 ends up in this position, the control system may responsively determine that this respective line of sight is obstructed and may do so as discussed above for instance. Also, FIG. 5B shows the controller 250 receiving a request 540 (e.g., via input/output unit 258) requesting an update to position information being provided for worker robot 530. Specifically, the request 540 is for an adjustment from providing a level of positional accuracy 542 for the worker robot 530 to providing a level of positional accuracy 544 (e.g., higher than level 542) for the worker robot 530. Other illustrations are possible as well.

B. Determining Candidate Observer Robot Locations and Intended Levels of Positional Accuracy At block 404, method 400 involves, in response to detecting the event, the control system: (i) determining one or more observer robot locations within the worksite at which one or more of the respective sensors are each capable of providing information related to respective positions of one or more of the plurality of target objects and (ii) determining a respectively intended level of positional accuracy for at least two respective target objects of the plurality of target objects.

Once the control system detects at least one event, the control system may responsively determine candidate locations within the worksite to which one or more observer robots may be relocated. Also, the control system may determine a respectively intended level of positional accuracy for each of various target objects within the worksite. These determinations may occur in any order.

More specifically, when the control system determines the candidate locations, the control system may specifically determine observer robot locations within the worksite at which respective sensor(s) of observer robot(s) are each capable of providing position information for one or more of the target objects. In doing so, the control system may determine locations at which the control system ensures that at least one sensor of each respective observer robot has a line of sight between itself and at least one target object for which position information is to be provided. Accordingly, the control system may determine these candidate locations in various ways.

In one instance, because the control system may have already received (and/or is receiving) from various observer robots position information for at least some target objects within the worksite, the control system may have a model of the worksite representative of positions of at least these target objects and thus the control system may determine the above-mentioned candidate locations based on this model. In particular, the control system may programmatically determine coordinates of a target object (e.g., a worker robot) within the worksite and may also select specific coordinates within the worksite. Then, the control system may evaluate intermediate coordinates that are positioned directly (e.g., along a substantially straight line) between the specific coordinates and the coordinates of the target object.

While evaluating the intermediate coordinates, the control system may determine whether at least one of these intermediate coordinates matches coordinates of at least one other object (e.g., a mover robot) within the worksite. If the control system determines that there is no such match, then the control system may responsively determine that no object is positioned directly between the specific coordinates and coordinates of the target object. Hence, the control system may determine that the specific coordinates correspond to a candidate location at which an observer robot would have a respectively unobstructed line of sight between the observer robot's sensor and the target object.

Whereas, if the control system determines at least one such match, then the control system may responsively determine that at least one object is positioned directly between the specific coordinates and coordinates of the target object. Hence, based on this evaluation, the control system may determine that the specific coordinates do not correspond to a candidate location because an observer robot located at the specific coordinates would have a respectively obstructed line of sight between the observer robot's sensor and the target object. However, the control system could determine that the specific coordinates do correspond to a candidate location if the control system also determines that an observer robot located at the specific coordinates would have a respectively unobstructed line of sight between the observer robot's sensor and a different target object. So in this manner, the control system may select various specific coordinates (e.g., select coordinates randomly and/or select predetermined coordinates) throughout the worksite and, for each such selected coordinate, the control system may whether the selected coordinate is a candidate observer robot location.

In another instance, the control system could take a trial and error approach for determining the candidate locations. In particular, the control system may direct an observer robot to move to each of one or more locations within the worksite (e.g., randomly selected location and/or predetermined locations). When the control system determines that the observer robot has move to a given one of the locations (e.g., based on position information from other observer robots), the control system may determine whether line of sight between the observer robot's sensor and at least one target object is obstructed. For example, the control system may determine that the line of sight is obstructed if the control system determines that there is a threshold difference between position information provided by the observer robot at issue for the at least one target object and position information provided by one or more other observer robots for the at least one target object.

In this instance, if the control system determines that the line of sight is unobstructed, then the control system may responsively determine that the given location is a candidate observer robot location. Whereas, if the control system determines that the line of sight is obstructed, then the control system may responsively determine that the given location is not a candidate observer robot location. However, the control system could determine this location is a candidate location if the control system also determines that an observer robot located at this location would have a respectively unobstructed line of sight between the observer robot's sensor and a different target object. As such, the control system may carry out these determinations for each location to which the observer robot moves. Alternatively, the control system the control system may carry out these determinations for each such location until the observer robot moves to a location at which a line of sight is unobstructed. Moreover, the control system could carry out this approach for each of one or more observer robots within the worksite. Other instances are possible as well.

As noted, the control system may also determine a respectively intended level of positional accuracy for each of various target objects within the worksite. To do so, the control system may have stored thereon or may otherwise have access to mapping data that maps certain target objects to certain levels of positional accuracy that the disclosed system intends to provide to respective target objects. This mapping data may update based on the adjustments discussed above, such as based on user-input data specifying an adjusted (e.g., requesting a certain level of positional accuracy) and/or based on adjustments determined according to changes in conditions within the worksite, among others. As such, the control system may refer to the mapping data to determine respectively intended level of positional accuracy for a given target object. Other approaches are possible as well.

Figure 6A:
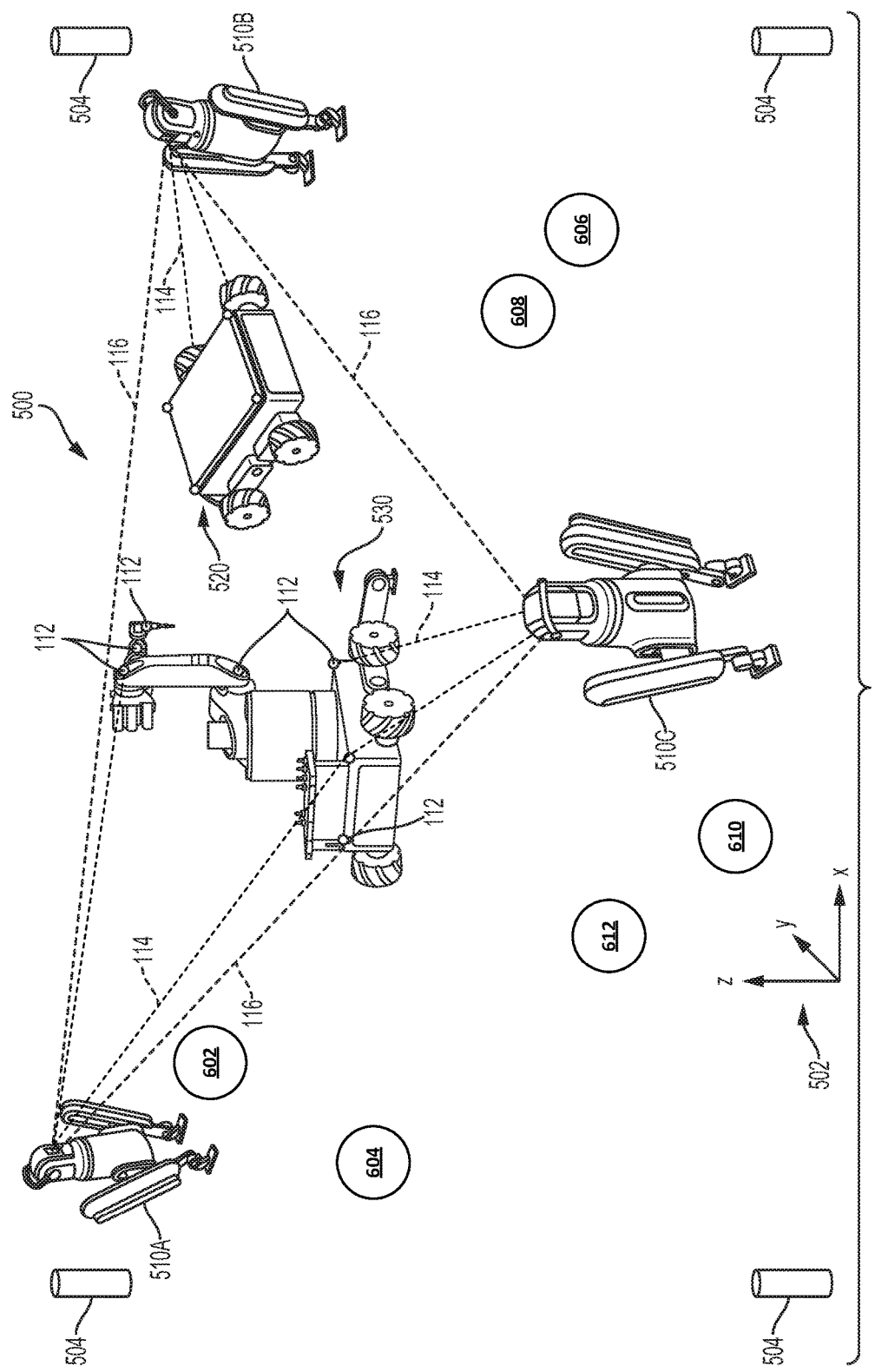
FIG. 6A depicts candidate observer robot locations, according to an example implementation.

FIG. 6A illustrates examples of candidate observer robot locations. As shown in FIG. 6A, the control system determined candidate observer robot locations 602 and 604 for observer robot 510A. While the current location of observer robot 510A already provides the observer robot 510A with a respective line of sight 112 to the worker robot 530, the location 602 may additionally allow the observer robot 510A to move to a distance that is closer to the worker robot 530 and the location 604 may additionally allow the observer robot 510A to move to location that provides a different angular position for the observer robot 510A's line of sight relative to the worker robot 530. Such changes in distance and angle are discussed in more detail below.

Further, FIG. 6A shows that the control system determined candidate observer robot locations 606 and 608 for observer robot 510B. These locations 606 and 608 each provide the observer robot 510B with a respective line of sight 112 to the worker robot 530, with the location 608 being closer to the worker robot 530 than the location 606. Furthermore, FIG. 6A shows that the control system determined candidate observer robot locations 610 and 612 for observer robot 510C. While the current location of observer robot 510C already provides the observer robot 510C with a respective line of sight 112 to the worker robot 530, the locations 610 and 612 may each respectively allow the observer robot 510C to move to location that provides a different angular position for the observer robot 510C's line of sight relative to the worker robot 530, with the location 612 being closer to the worker robot 530 than the location 610. Note that the control system could also determine other candidate locations.

Figure 6B:
FIG. 6B depicts a table representing mapping data that maps certain target objects to certain levels of positional accuracy, according to an example implementation.

FIG. 6B then illustrates an example table 620 representing mapping data that maps certain target objects to certain levels of positional accuracy. As shown, observer robots 510A to 510C may respectively have corresponding levels of positional accuracy 622 to 626. And to achieve the level of positional accuracy 622 for observer 510A, for instance, the control system could receive position information from one or both of observer robots 510B to 510C and/or from other observer robots (not shown). Additionally, mover robot 520 may have a corresponding level of positional accuracy 628. And to achieve the level of positional accuracy 628 for mover robot 520, the control system could receive position information from one or more of observer robots 510A to 510C and/or from other observer robots (not shown). Further, worker robot 530 may have a corresponding level of positional accuracy 544, which may be based on the request 540 illustrated in FIG. 5B. And to achieve the level of positional accuracy 544 for mover robot 520, the control system could receive position information from one or more of observer robots 510A to 510C and/or from other observer robots (not shown). Other illustrations are possible as well.

C. Selecting Observer Robot Locations

At block 406, method 400 involves, based at least in part on the determined respectively intended levels of positional accuracy, the control system selecting one or more of the determined observer robot locations within the worksite.

Once the control system determines the candidate observer robot locations as well as the respectively intended levels of positional accuracy for each of various target objects, the control system may select observer robot locations from among the determined candidate locations. The control system may carry out the selection based on various factors, such as the intended levels of positional accuracy and/or other factors. Each such factor may be given a certain weight in the process of making the selection. For instance, the selection process may be treated as an optimization problem (e.g., using optimization techniques that are currently known or developed in the future) with each factor being a constraint that is given a certain weight and with the solution to the problem being an indication of the observer robot locations to select. Additionally or alternatively, one or more factors may each be applied as a "hard rule" and may thus solely or in combination cause the selection of one or more observer robot locations. Various example factors for selection are described below.

i. Selection of Locations Based on Priority Levels

In an example implementation, the control system may select observer robot locations at which observer robots are capable of providing position information for each target object for which position information is desired. In particular, the control system may select observer robot locations so that, for each target object, there is at least one unobstructed line of sight provided by at least one observer robot. Moreover, the control system may select observer robot locations at which observer robots are capable of providing position information with each respectively intended level of positional accuracy being met. As such, the control system may essentially optimize the observer robot locations in order to obtain position information for each target object and to do so at the respectively intended level of positional accuracy for each such target object.

While the control system may attempt to select observer robot locations based on these factors, the control system may, in some situations, not be able to optimize the observer robot locations in this manner. For instance, in some situations, the control system may not be able to select observer robot locations so that, for each target object, there is at least one unobstructed line of sight provided by at least one observer robot. Rather, the control system may only be able to select observer robot locations so that, for at least some of target objects (e.g., but not for each target object), there is at least one respectively unobstructed line of sight provided by at least one observer robot. And in another instance, the control system may be able to select observer robot locations so that, for each target object, there is at least one unobstructed line of sight provided by at least one observer robot. However, at these selected observer robot locations, observer robots may not be capable of providing position information with each respectively intended level of positional accuracy being met. Other instances are possible as well.

When the control system is not able to select observer robot locations at which the control system can obtain position information for each target object and at the respectively intended level of positional accuracy for each such target object, the control system may responsively carry out the selection of observer robot locations based on prioritization of target objects. In particular, as noted above, the control system may have stored thereon or may otherwise have access to information related to respective priority levels for each target object, with each such priority level indicating priority of providing position information for a respective target object. So when the control system essentially has to choose, from among two or more target objects, target objects for which to obtain position information at respectively intended levels of positional accuracy, the control system may responsively seek to first obtain position information for the maximum possible number of target objects that are of highest priority.

For instance, the control system may select observer robot locations at which the control system can obtain position information (at the respectively intended levels of positional accuracy) for target objects having relatively higher corresponding priority levels. And the control system could then later select observer robot locations at which the control system can obtain position information (at the respectively intended levels of positional accuracy) for other target objects, such for at least some target objects having relatively lower corresponding priority levels and/or for at least some of the target objects having relatively higher corresponding priority levels. Other approaches are possible.

In a simplified implementation of this process, the control system may compare first and second target objects (e.g., from among two or more target objects). In particular, the control system may determine that the first target object has a first corresponding priority level and that the second object has second corresponding priority level. In doing so, the control system may determine that the first priority level is higher than the second priority level. And in response to determining that the first priority level is higher than the second priority level, the control system may select observer robot locations at which observer robots are capable of providing position information for at least the first target object. So in this implementation, the control system may prioritize the target objects to ensure that position information is initially obtained for the first target object at the respectively intended level of positional accuracy of the first target object. And if the control system can select the observer robot locations so as to also simultaneously obtain position information for the second target object at the respectively intended level of positional accuracy of the second target object, then the control system may do so.

Otherwise, if the control system has to select either (i) first observer robot locations at which observer robots are only capable of providing position information for the first target object at the respectively intended level of positional accuracy of the first target object (and perhaps also for one or more target object other than the second target object) or (ii) second observer robot locations at which observer robots are only capable of providing position information for the second target object at the respectively intended level of positional accuracy of the second target object (and perhaps also for one or more target object other than the first target object), then the control system may responsively select the first observer robot locations. And then at a later point in time, the control system could select observer robot locations so as to obtain position information for the second target object at the respectively intended level of positional accuracy of the second target object.

Figure 7:
FIG. 7 depicts a table representing mapping data that maps certain target objects to certain priority levels, according to an example implementation.

FIG. 7 illustrates an example table 700 representing mapping data that maps certain target objects to certain priority levels. In particular, the priority levels are represented on a scale of 1 (one) to 10 (ten), with 10 being representative of the highest priority level and 1 being representative of the lowest priority level. Moreover, FIG. 7 shows that observer robot 510A has a corresponding priority level of 8 (eight), that observer robot 510B has a corresponding priority level of 7 (seven), that observer robot 510C has a corresponding priority level of 6 (six), that mover robot 520 has a corresponding priority level of 5 (five), and that worker robot 530 has a corresponding priority level of 10 (ten).

In an example process of prioritizing these target objects, if the control system is able to select observer robot locations at which the control system can obtain position information for each of these target objects and do so at the respectively intended level of positional accuracy of each such target object, then the control system may responsively do so. But if the control system is not able to do so, then control system responsively attempt to select observer robot locations at which the control system can obtain position information for observer robots 510A to 510C and worker robot 530 and do so at the respectively intended level of positional accuracy of each of these target objects. And if the control system is also not able to select in this manner, then control system responsively attempt to select observer robot locations at which the control system can obtain position information for observer robots 510A to 510B and worker robot 530 and do so at the respectively intended level of positional accuracy of each of these target objects. And if the control system is further not able to select in this manner, then control system responsively attempt to select observer robot locations at which the control system can obtain position information for observer robots 510A and worker robot 530 and do so at the respectively intended level of positional accuracy of each of these target objects. And if the control system is yet further not able to select in this manner, then control system responsively attempt to select observer robot locations at which the control system can obtain position information for worker robot 530 and do so at the respectively intended level of positional accuracy of worker robot 530. Other examples and illustrations are also possible.

ii. Selection of Locations to Achieve the Intended Levels

In another example implementation, the control system may select observer robot locations with the purpose of achieving the respectively intended level of positional accuracy of each target object for which the control system ends up obtaining position information. In particular, as noted above, detecting the event may involve or may otherwise be responsive to a desired adjustment from providing a certain level of positional accuracy for the given target object to providing another level of positional accuracy for the given target object. In one case, as noted, user-input data may indicate the adjustment, such as when a user of the system essentially requests a respectively intended level of positional accuracy. And in another case, as noted, the control system may determine changes in one or more conditions within the worksite and, based on these changes, the control system may determine at least one corresponding desired adjustment of a respective level of positional accuracy.

In either case, the control system may essentially determine that there is at least one intended change from (i) providing a first respective level of positional accuracy for a given target object to (ii) providing a second (e.g., intended) respective level of positional accuracy for the given target object. Accordingly, this intended change may involve either a decrease or an increase of the respective level of positional accuracy for the given target object. Moreover, the control system may carry out one or more sets of operations to ultimately achieve the intended change.

In one example set of operations, the control system may carry out the intended change by changing the distance of at least observer robot away from a target object. In particular, increasing the distance away from a target object may proportionally (e.g., linearly, exponentially, or otherwise) decrease the respective level of positional accuracy that the observer robot provides for the target object. Whereas, decreasing the distance away from a target object may proportionally increase the respective level of positional accuracy that the observer robot provides for the target object. So in this example set of operations, the control system may determine a distance away from the target object at which the observer robot should be located in order to provide the respectively intended level of positional accuracy of the target object.

For instance, the control system may do so by determining that the intended change in the respective level of positional accuracy corresponds to a distance change from the observer robot being at a first distance away from the target object to the observer robot being at a second distance away from the target object. In practice, this corresponding distance change may be further based on configuration of the observer robot, such as based on the specific type of sensors included in the observer robot, among others. Regardless, the control system may select observer robot locations at least in accordance with the corresponding distance change. In doing so, the control system may select an observer robot location at which the observer robot is to be located to the second distance away from the target object.

Figure 8A:
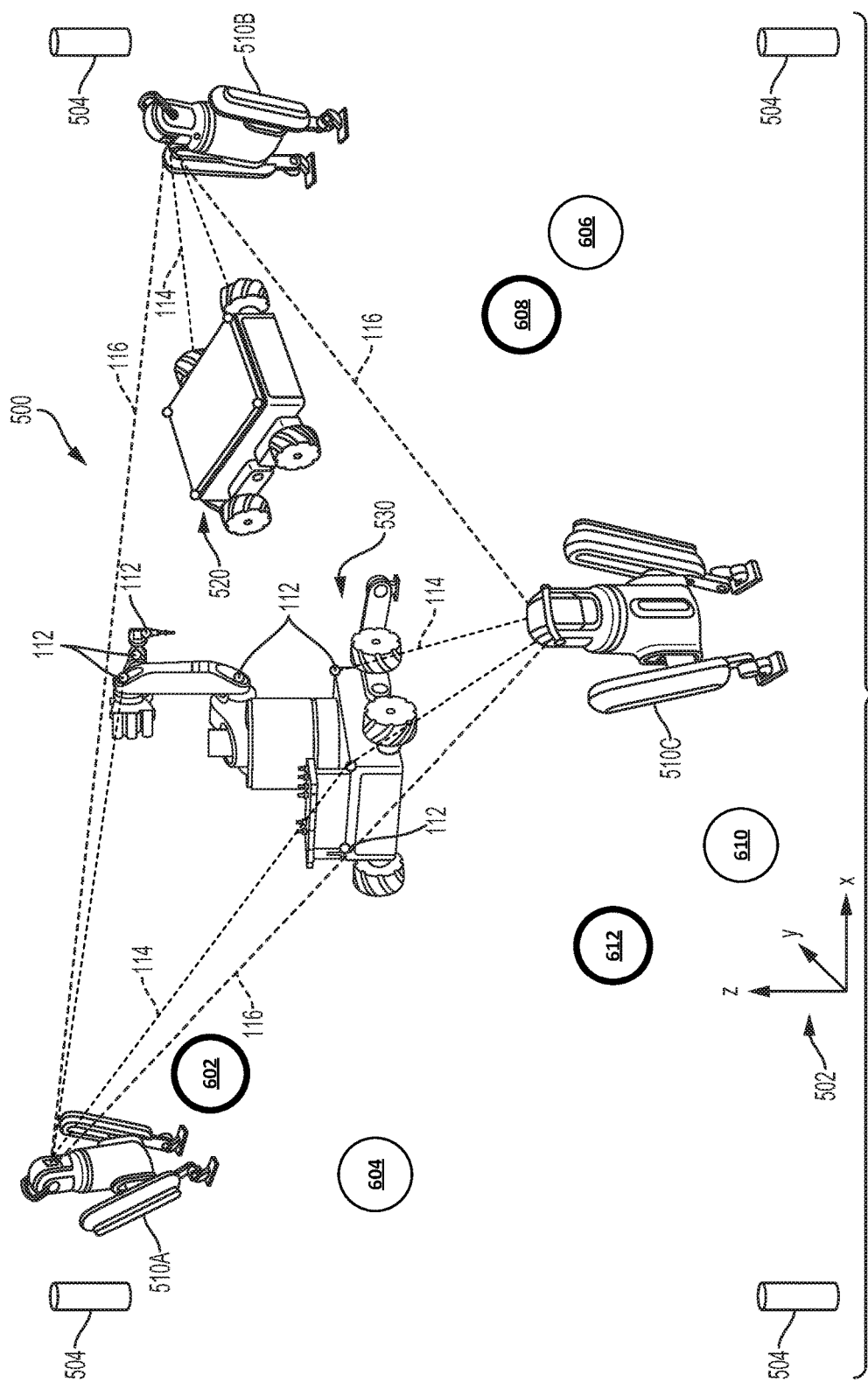
FIG. 8A depicts a change in respective distance between each observer robot and a target object, according to an example implementation.

FIG. 8A illustrates observer robot locations at which a distance change may be achieved. In particular, relocating the observer robot 510A to observer robot location 602 may cause the observer robot 510A to be located at a closer distance away from the worker robot 530, thereby proportionally increasing the respective level of positional accuracy at which the observer robot 510A provides position information for the worker robot 530. Also, relocating the observer robot 510B to observer robot location 608 may cause the observer robot 510B to be located at a closer distance away from the worker robot 530, thereby proportionally increasing the respective level of positional accuracy at which the observer robot 510B provides position information for the worker robot 530. Further, relocating the observer robot 510C to observer robot location 612 may cause the observer robot 510C to be located at a closer distance away from the worker robot 530, thereby proportionally increasing the respective level of positional accuracy at which the observer robot 510C provides position information for the worker robot 530. Other illustrations are possible as well.

In another example set of operations, the control system may carry out the intended change by changing the number of sensors being used to provide position information for a given target object. The change in the number of sensors may involve increasing or decreasing the number of observer robots that provide position information for the given target object. Also, if certain observer robots each have two or more sensors that can provide position information, then the change in the number of sensors may additionally or alternatively involve increasing or decreasing the number of sensors that each of one or more of the observer robots use to provide position information for the given target object. Further, the change in the number of sensors may additionally or alternatively involve increasing or decreasing the number of other sensors in the worksite that each provide position information for the given target object. Other options are possible as well.

In this example set of operations, increasing the number of sensors being used to provide position information for the given target object may proportionally (e.g., linearly, exponentially, or otherwise) increase the respective level of positional accuracy that the observer robot provides for the target object. Whereas, decreasing the number of sensors being used to provide position information for the given target object may proportionally decrease the respective level of positional accuracy that the observer robot provides for the target object. Accordingly, the control system may determine a sensor count in order to provide the respectively intended level of positional accuracy of the given target object.

For instance, the control system may do so by determining that the intended change in the respective level of positional accuracy corresponds to a count change from having a first number of sensors each provide position information for the given target object to having a second number of sensors each provide position information for the given target object. In practice, this corresponding count change may be further based on configuration of these sensors, such as based on the specific types of sensors being used, among others. Regardless, the control system may select observer robot locations at least in accordance with the corresponding count change. In doing so, the control system may select an observer robot location at which the observer robots are collectively capable of having the second number of sensors each provide position information for the given target object.

Figure 8B:
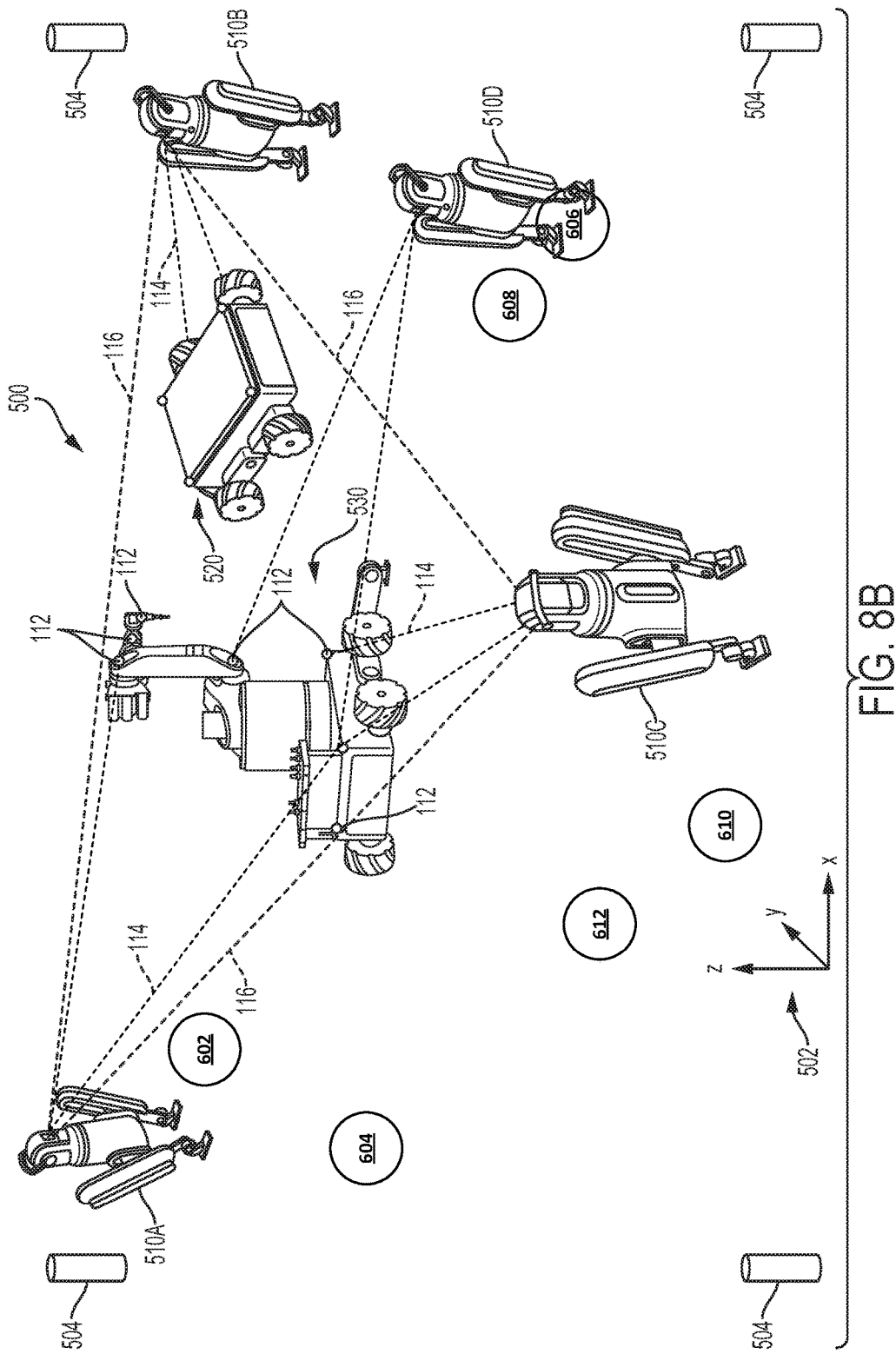
FIG. 8B depicts a change in the number of sensors that provide position information for a target object, according to an example implementation.

FIG. 8B illustrates a change in the number of sensors that provide position information for a target object. In particular, as discussed above in association with FIG. 5B, a mover robot 520 ends up being positioned between a laser tracker of the observer robot 510B and markers 112 of the worker robot 530, thereby obstructing the line of sight between this laser tracker and markers 112 of the worker robot 530. This may lead in a decrease in the number of sensors that provide position information or worker robot 530, since the observer robot 510B is no longer able to provide the position information and observer robots 510A and 510A are still able to provide the position information. As a result, FIG. 8B illustrates that the control system determines that another observer robot 510D should provide position information for the worker robot 530, so as to increase the number of sensors that provide position information or worker robot 530. And the control system is shown to select observer robot location 606 as the location at which observer robot 510D should be located. Other illustrations are possible as well.

In yet another example set of operations, the control system may carry out the intended change by changing an angle between respective lines of sight of at least two sensors that provide position information for a given target object. For instance, a first observer robot's sensor may be oriented in a first direction (e.g., has a first line of sight) towards the given target object as that first observer robot's sensor provides position information for the given target object. And a second observer robot's sensor may be oriented in a second direction (e.g., has a second line of sight) towards the given target object as that second observer robot's sensor provides position information for the given target object. As such, the control system may adjust the respective level of positional accuracy being provided for the given target object by adjusting a particular angle between these first and second directions, thereby selecting observer robot locations at which the particular angle is achieved.

More specifically, a respective level of positional accuracy provided by a certain observer robot could be different or could be the same for each coordinate within a coordinate system. For example, a certain observer robot may provide a first respective level of positional accuracy of the target object's x-coordinate position and may provide a second respective level of positional accuracy of the target object's y-coordinate position. So these first and second levels may be the same as one another or could be different from one another. And since different observer robots may provide different respective levels of positional accuracy for different coordinates, the control system may select observer robot location so that sensor orientations result in certain levels of positional accuracy for certain coordinates.

For instance, a first observer robot may be located at an observer robot location at which the first observer robot's sensor provides a given target object's x-coordinate position at a first respective level of positional accuracy while a second observer robot may be located at an observer robot location at which the second observer robot's sensor provides the given target object's x-coordinate position at a second respective level of positional accuracy. In this instance, the first respective level of positional accuracy may be higher than the second respective level of positional accuracy. As such, the highest respective level of positional accuracy that control system may obtain for the given target object's x-coordinate is the first level that is provided by the first observer robot's sensor for the given target object's x-coordinate position.

Further, at the first observer robot's location, the first observer robot's sensor may provide the given target object's y-coordinate position at a first respective level of positional accuracy while, at the second observer robot's location, the second observer robot's sensor may provide the given target object's y-coordinate position at a second respective level of positional. In this instance, the second respective level of positional accuracy may be higher than the first respective level of positional accuracy. As such, the highest respective level of positional accuracy that control system may obtain for the given target object's y-coordinate is the second level that is provided by the second observer robot's sensor for the given target object's y-coordinate position.

Accordingly, the control system may select observer robot locations to achieve certain respective levels of positional accuracy for certain coordinates. For instance, when the above mentioned particular angle is substantially perpendicular (i.e., the first direction is substantially orthogonal to the second direction), the control system may obtain the highest level of positional accuracy for each respective coordinate (e.g., x and y-coordinates) due to position errors substantially canceling each other out for each respective coordinate. And as the particular angle is increased or decrease away from perpendicularity, at respective level of positional accuracy for at least one of the coordinates may proportionally decrease. Other instances are possible.

Figure 8C:
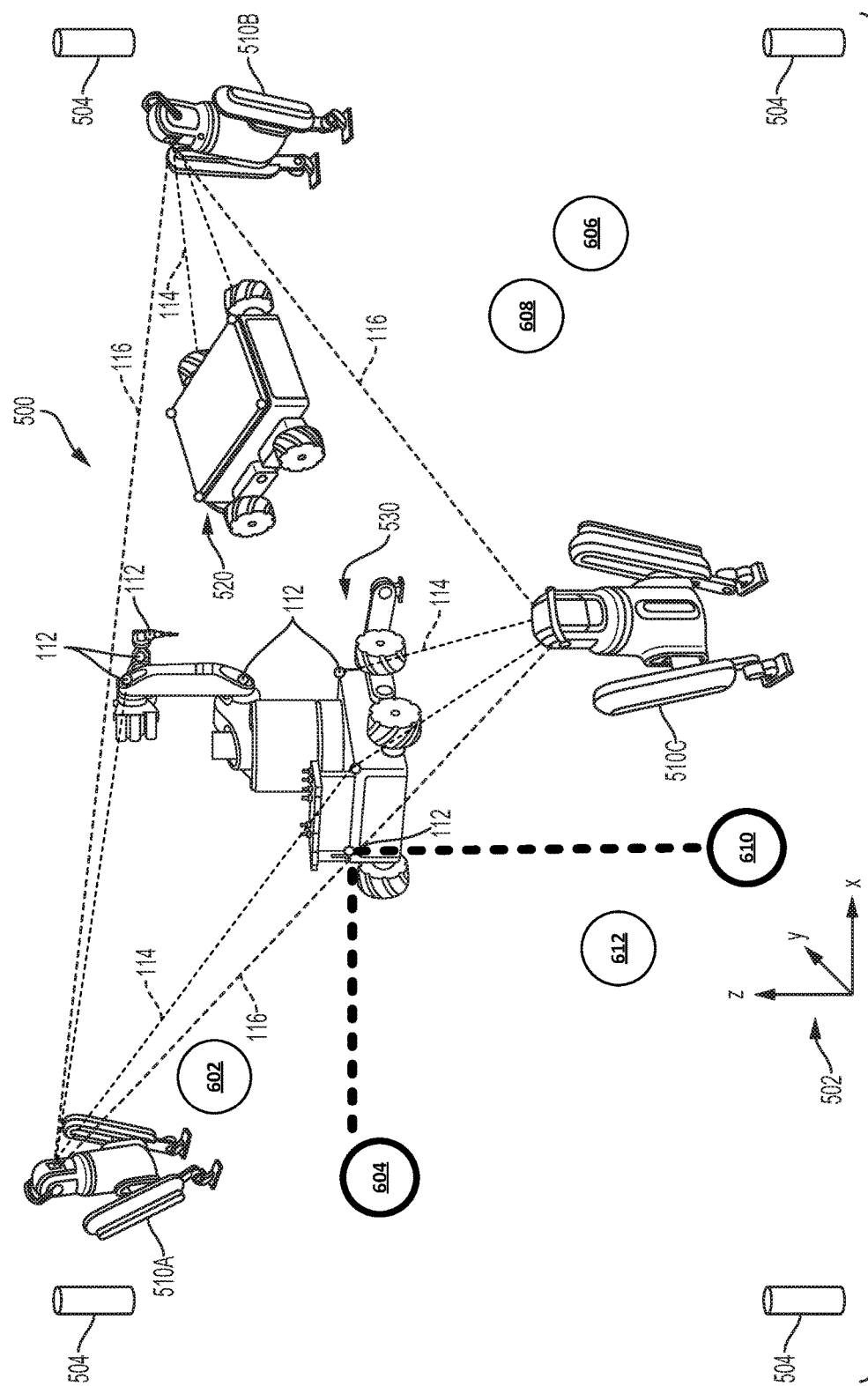
FIG. 8C depicts a change in angle between sensors of observer robots, according to an example implementation.

FIG. 8C illustrates a change in angle between observer robots for the purpose of increasing a respective level of accuracy provided for a target object. As shown, the control system may select the observer robot location 604 for the observer robot 510A and may select the observer robot location 610 for the observer robot 510C. And at these selected observer robot locations, the observer robot 510A's sensor may provide a first line of sight towards a marker 112 of the worker robot 530 while the observer robot 510C's sensor may provide a second line of sight towards the marker 112 of the worker robot 530. Since these first and second lines of sight may be substantially perpendicular, the control system may obtain position information for the worker robot 530 at the highest level of positional accuracy.

D. Directing Observer Robots to Relocate

At block 408, method 400 involves directing, by the control system, one or more of the plurality of observer robots to relocate to the one or more selected observer robot locations within the worksite.

Once the control system selects the observer robot locations, the control system may direct observer robots to move to respective selected location. To do so, the control system may transmit a command to each respective observer robot specifying the location selected for the respective observer robot, among other ways. Moreover, the control system may direct the relocated observer robot to provide position information for one or more target objects and do so at the respectively intended levels of positional accuracy for those target objects. In this manner, the control system may dynamically optimize observer robot locations so as to continue obtaining desired information regarding positions of target objects throughout the worksite, which may ultimately allow the control system to keep track of work progress in the worksite, among other outcomes.

Figure 9:
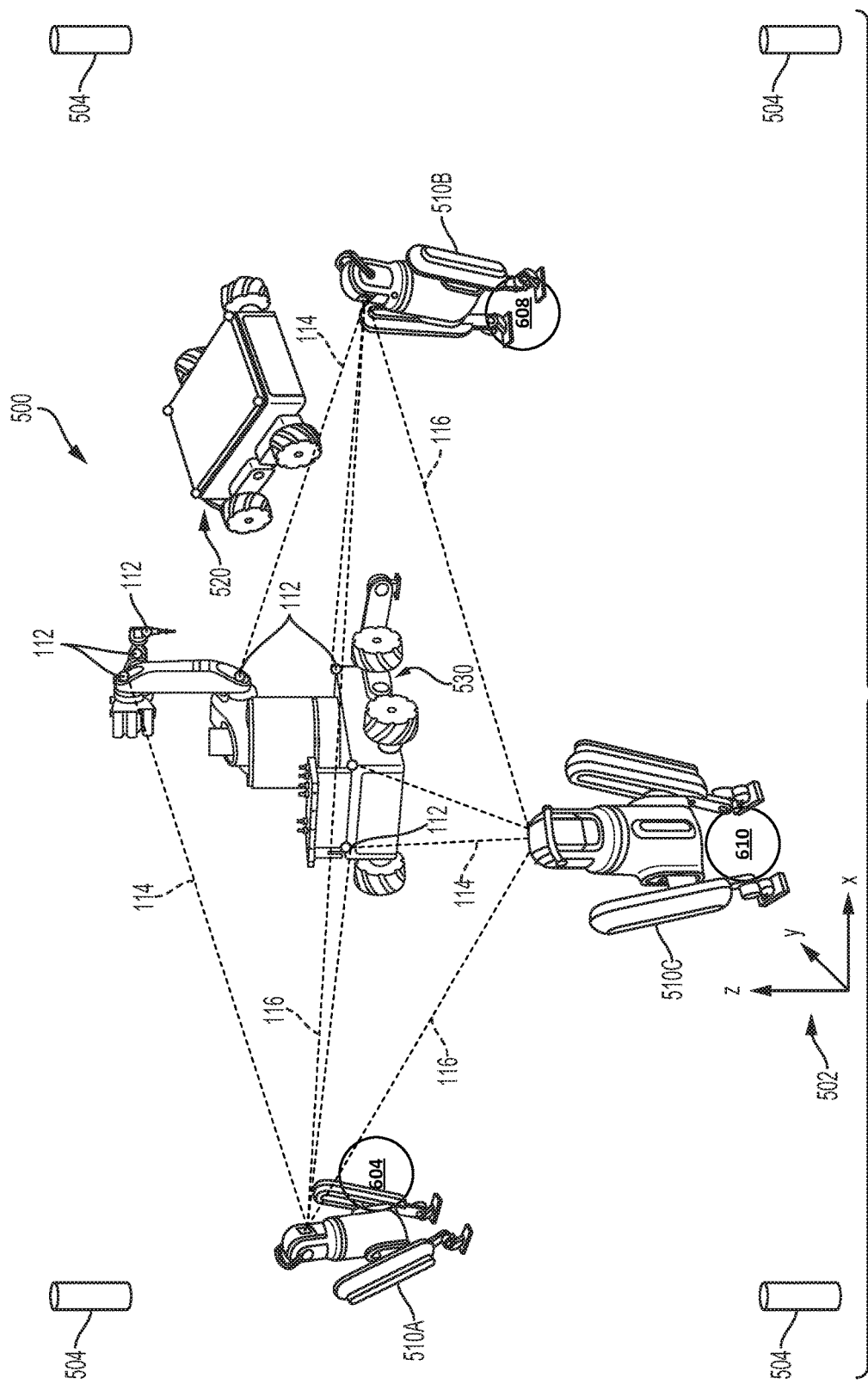
FIG. 9 depicts relocation of observer robots throughout a worksite, according to an example implementation.

FIG. 9 illustrates relocation of observer robots throughout the worksite. As shown, the control system has directed relocation of observer robot 510A to observer robot location 604, of observer robot 510B to observer robot location 608, and of observer robot 510C to observer robot location 610. At these observer robot locations, the observer robots 510A to 510C may each respectively provide position information for the worker robot 530 and may collectively do so at the respectively intended level of positional accuracy of the worker robot 530. Other illustrations are also possible.

In a further aspect, once the observer robots have relocated and have been directed to provide position information, the control system may verify whether each respectively intended level of positional accuracy is being met for each target object for which position information is provided. To do so, for instance, the control system may compare the respectively intended level of positional accuracy of a certain target object to the actual level of positional accuracy that is being provided for that certain target object, and the control system may then determine whether these levels are different from another or whether these levels are the same. Other approaches are possible as well.

Accordingly, if the control system determines that each respectively intended level of positional accuracy for each respective target object is being met, then the control system may responsively determine that the relocated observer robots should remain at the selected observer robot locations. Whereas, if the control system determines that at least one respectively intended level of positional accuracy for at least one respective target object is not being met, then the control system may responsively determine that a further event has been detect, which may be indicate that one or more observer robots should be further relocated within the worksite. As a result, the control system may then again optimize the observer robot locations.

III. OBSERVER AERIAL VEHICLES

In yet a further aspect, an observer robot could sometimes take the form of an aerial vehicle that defines a vehicle capable of flying (e.g., a drone). The aerial vehicle may operate in a remote-control mode that involves travel in accordance with instructions from a physically-present operator, in an autonomous mode that involves without a physically-present operator, and/or in a partially autonomous mode that may involve autonomous travel as well as travel in accordance with instructions from a physically-present operator. Moreover, the aerial vehicle may include one or more sensors (such as those discussed above) each capable of providing position information and/or work progress information, among other possibilities.

With this arrangement, one or more aerial vehicles may each provide position information for a given target object. This position information may be provided in addition to or instead of position information provided by other observer robots that are not capable of flying. Moreover, since an aerial vehicle is capable of flying, the aerial vehicle may provide position information from different perspectives that other observer robots may not be able to achieve. And due to these different perspectives, the aerial vehicle may orient the aerial vehicle's sensor(s) at various angles relative to the target object, so as to proportionally change respective levels of positional accuracy as discussed above.

Figure 10:
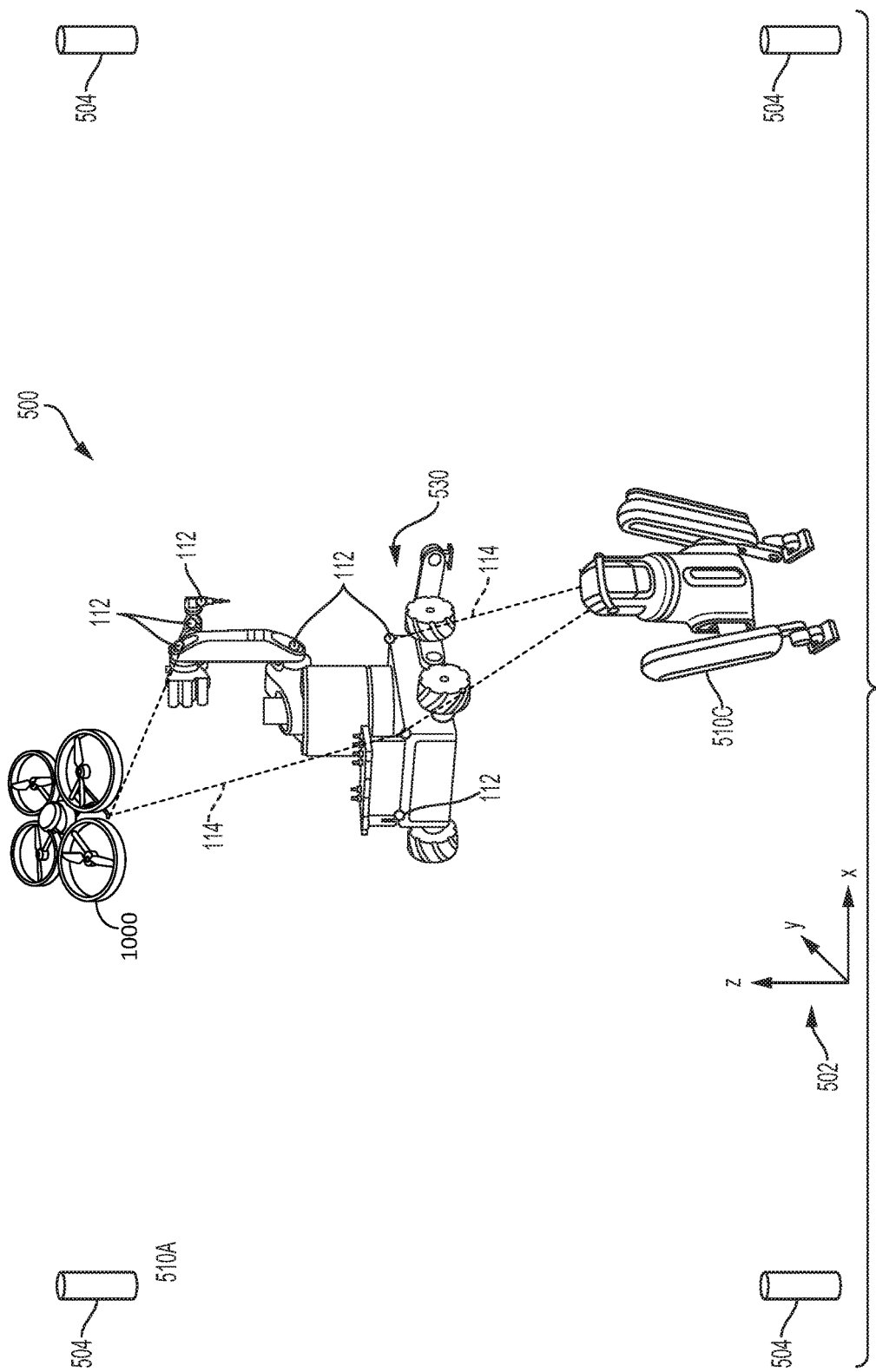
FIG. 10 depicts an aerial vehicle that provides position information, according to an example implementation.

FIG. 10 illustrates aerial vehicle 1000 directing sensors of the aerial vehicle 100 toward markers 112 attached to the worker robot 530 along respective lines of sight 114. And at the same time, FIG. 10 illustrates observer robot 510C directing sensors of the observer robot 510C toward markers 112 attached to the worker robot 530 along respective lines of sight 114. In this manner, the control system receives position information for the worker robot 530 from both the aerial vehicle 1000 and the observer robot 510C. Other illustrations are also possible.

IV. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A method comprising:
    detecting, by a control system, an event that indicates desired relocation of one or more of a plurality of observer robots within a worksite, wherein each respective observer robot of the plurality of observer robots has one or more respective sensors configured to provide information related to respective positions of a plurality of target objects within the worksite;
    in response to detecting the event, the control system: (i) determining one or more observer robot locations within the worksite at which one or more of the respective sensors are each capable of providing information related to respective positions of one or more of the plurality of target objects and (ii) determining a respectively intended level of positional accuracy for at least two respective target objects of the plurality of target objects;
    based at least in part on the determined respectively intended levels of positional accuracy, the control system selecting one or more of the determined observer robot locations within the worksite; and
    directing, by the control system, one or more of the plurality of observer robots to relocate to the one or more selected observer robot locations within the worksite.

2. The method of claim 1, wherein detecting the event comprises determining that at least one of the respective sensors is no longer capable of providing information related to respective position of at least one target object of the plurality of target objects.

3. The method of claim 2, wherein determining that at least one of the respective sensors is no longer capable of providing information related to respective position of at least one target object of the plurality of target objects comprises determining that a field of view between at least one of the respective sensors and at least one target object of the plurality of target objects is obstructed.

4. The method of claim 1,
    wherein a first respective level of positional accuracy is provided for at least one given target object of the plurality of target objects before the event is detected, and
    wherein detecting the event comprises determining an adjustment from (i) providing the first respective level of positional accuracy for the at least one given target object to (ii) providing a second respective level of positional accuracy for the at least one given target object.

5. The method of claim 4, wherein determining the adjustment comprises receiving user-input data indicating the adjustment, and wherein the determination of the respectively intended level of positional accuracy for the at least one given target object is based at least in part on the received user-input data.

6. The method of claim 4, wherein detecting the event comprises determining one or more changes in conditions within the worksite, and wherein the adjustment is responsive to at least the one or more changes in conditions within the worksite.

7. The method of claim 6, wherein the one or more changes in conditions within the worksite comprise changes to one or more of the following conditions: (i) location within the worksite of one or more of the respective sensors, (ii) location within the worksite of one or more of the plurality observer robots, (iii) location within the worksite of one or more other robots, (iv) location within the worksite of one or more of the plurality of target objects, (v) location within the worksite of one or more other objects, (vi) configuration of one or more of the respective sensors, (vii) configuration of one or more of the plurality observer robots, (viii) configuration of one or more other robots, (ix) configuration of one or more of the plurality of target objects, (x) configuration of one or more other objects, and (xi) work progress within the worksite.

8. The method of claim 1, wherein determining one or more observer robot locations comprises determining one or more observer robot locations at which a field of view between at least one of the respective sensors and at least one target object of the plurality of target objects is unobstructed.

9. The method of claim 1, further comprising:
the control system referring to a data storage containing mapping data that maps each respective target object to the respectively intended level of positional accuracy, wherein determining the respectively intended level of positional accuracy for the at least two respective target objects of the plurality of target objects is based at least on the mapping data.

10. The method of claim 1, wherein selecting one or more of the determined observer robot locations within the worksite comprises selecting one or more of the determined observer robot locations based on each respectively intended level of positional accuracy being met by one or more of the respective sensors.

11. The method of claim 1, wherein selecting one or more of the determined observer robot locations within the worksite comprises selecting one or more of the determined observer robot locations at which one or more of the respective sensors are capable of providing information related to respective positions of the at least two respective target objects of the plurality of target objects.

12. The method of claim 1, wherein determining the respectively intended level of positional accuracy for a given one of the target objects comprises determining an intended change from (i) providing a first respective level of positional accuracy for the given target object of the plurality of target objects to (ii) providing a second respective level of positional accuracy for the at least one given target object.

13. The method of claim 12, wherein selecting one or more of the determined observer robot locations within the worksite comprises:
determining that the intended change corresponds to a distance change from (i) at least one observer robot of the plurality of observer robots being located at a first distance away from the given target object to (ii) the at least one observer robot being located at a second distance away from the given target object; and
selecting at least one observer robot location based on the at least one observer robot being located at the second distance away from the given target object.

14. The method of claim 12, wherein selecting one or more of the determined observer robot locations within the worksite comprises:
determining that the intended change corresponds to a count change from (i) having a first number of respective sensors each provide information related to respective position of the given target object to (ii) having a second number of respective sensors each provide information related to respective position of the given target object; and
selecting one or more of the observer robot locations at which one or more of the observer robots are capable of having the second number of respective sensors each provide information related to respective position of the given target object.

15. The method of claim 12,
wherein selecting one or more of the determined observer robot locations within the worksite comprises selecting (i) a first observer robot location at which a first respective sensor is capable of being oriented in a first direction towards to the given target object while the first respective sensor provides information related to respective position of the given target object and (ii) a second observer robot location at which a second respective sensor is capable of being oriented in a second direction towards to the given target object while the second respective sensor provides information related to respective position of the given target object,
wherein selecting the first and second observer robot locations comprises, based on the intended change, selecting a particular angle between the first and second directions, and
wherein relocating two or more of the observer robots to the selected at least first and second observer robot locations results in the intended change.

16. The method of claim 15, wherein selecting the particular angle between the first and second directions comprises setting the first direction to be substantially orthogonal to the second direction.

17. The method of claim 1, wherein the plurality of target objects each have corresponding priority level, and wherein selecting one or more of the determined observer robot locations within the worksite is further based at least in part on the corresponding priority levels.

18. The method of claim 17, wherein the plurality of target objects comprises at least first and second target objects, and wherein selecting one or more of the determined observer robot locations within the worksite based at least in part on the corresponding priority levels comprises:
determining that the first target object has a first corresponding priority level that is higher than a second corresponding priority level of the second target object; and
in response to determining that the first target object has the first corresponding priority level that is higher than the second corresponding priority level of the second target object, selecting one or more of the determined observer robot locations at which one or more of the respective sensors are capable of providing information related to respective position of at least the first target object.

19. The method of claim 17, wherein the plurality of target objects comprises at least first and second target objects, and wherein selecting one or more of the determined observer robot locations within the worksite based at least in part on the corresponding priority levels comprises:
making a first determination that the control system is to select either (i) one or more of the determined observer robot locations at which one or more of the respective sensors are only capable of providing information related to respective position of the first target object or (ii) one or more of the determined observer robot locations at which one or more of the respective sensors are only capable of providing information related to respective position of the second target object;
making a second determination that the first target object has a first corresponding priority level that is higher than a second corresponding priority level of the second target object; and
in response to both the first and second determinations, selecting one or more of the determined observer robot locations at which one or more of the respective sensors are capable of providing information related to respective position of the first target object.

20. The method of claim 1, further comprising:
directing, by the control system, each relocated observer robot to provide information related to respective positions of one or more of the plurality of target objects.

21. The method of claim 20, further comprising:
after directing each relocated observer robot to provide information related to respective positions of one or more of the plurality of target objects, the control system determining whether each respectively intended level of positional accuracy for the at least two respective target objects is met;
if the control system determines that each respectively intended level of positional accuracy for the at least two respective target objects is met, then the control system responsively determining that the relocated observer robots should remain at the one or more selected observer robot locations within the worksite; and
if the control system determines that at least one respectively intended level of positional accuracy for at least one respective target object is not met, then the control system responsively determining that a further event has been detect that indicate that one or more of the plurality of observer robots should be further relocated within the worksite.

22. A non-transitory computer readable medium having stored therein instructions executable by one or more processors to cause a control system to perform functions comprising:
detecting an event that indicates desired relocation of one or more of a plurality of observer robots within a worksite, wherein each respective observer robot of the plurality of observer robots has one or more respective sensors configured to provide information related to respective positions of a plurality of target objects within the worksite;
in response to detecting the event, (i) determining one or more observer robot locations within the worksite at which one or more of the respective sensors are each capable of providing information related to respective positions of one or more of the plurality of target objects and (ii) determining a respectively intended level of positional accuracy for at least two respective target objects of the plurality of target objects;
based at least in part on the determined respectively intended levels of positional accuracy, selecting one or more of the determined observer robot locations within the worksite; and
directing one or more of the plurality of observer robots to relocate to the one or more selected observer robot locations within the worksite.

23. A control system comprising:
one or more processors;
a non-transitory computer readable medium; and
program instructions stored on the non-transitory computer readable medium and executable by the one or more processors to:
detect an event that indicates desired relocation of one or more of a plurality of observer robots within a worksite, wherein each respective observer robot of the plurality of observer robots has one or more respective sensors configured to provide information related to respective positions of a plurality of target objects within the worksite;
in response to detecting the event, (i) determine one or more observer robot locations within the worksite at which one or more of the respective sensors are each capable of providing information related to respective positions of one or more of the plurality of target objects and (ii) determine a respectively intended level of positional accuracy for at least two respective target objects of the plurality of target objects;
based at least in part on the determined respectively intended levels of positional accuracy, select one or more of the determined observer robot locations within the worksite; and
direct one or more of the plurality of observer robots to relocate to the one or more selected observer robot locations within the worksite.

* * * * *